US011607635B2

(12) United States Patent
Arthur et al.

(10) Patent No.: US 11,607,635 B2
(45) Date of Patent: Mar. 21, 2023

(54) AIR FILTER CONDITION SENSING

(71) Applicant: 3M INNOVATIVE PROPERTIES COMPANY, St. Paul, MN (US)

(72) Inventors: Jonathan B. Arthur, Hudson, WI (US); Karl W. Bloedorn, Minneapolis, MN (US); Jayant Chakravarty, Woodbury, MN (US); Gene B. Portelli, Lake Elmo, MN (US); Dennis M. Glass, Cottage Grove, MN (US); Michael A. Meis, Stillwater, MN (US); Lyle L. Luppes, Rosemount, MN (US); Daniel W. Hennen, Cottage Grove, MN (US); Douglas D. Fletcher, Woodbury, MN (US); Eric O. Hemberg, Shatin (HK); Oscar M. Hemberg, Dalarö (SE)

(73) Assignee: 3M Innovative Properties Company, St. Paul, MN (US)

( * ) Notice: Subject to any disclaimer, the term of this patent is extended or adjusted under 35 U.S.C. 154(b) by 469 days.

(21) Appl. No.: 16/319,243

(22) PCT Filed: Aug. 4, 2017

(86) PCT No.: PCT/US2017/045492
§ 371 (c)(1),
(2) Date: Jan. 18, 2019

(87) PCT Pub. No.: WO2018/031403
PCT Pub. Date: Feb. 15, 2018

(65) Prior Publication Data
US 2019/0262756 A1 Aug. 29, 2019

Related U.S. Application Data

(60) Provisional application No. 62/374,040, filed on Aug. 12, 2016, provisional application No. 62/372,156, filed on Aug. 8, 2016.

(51) Int. Cl.
*B01D 46/00* (2022.01)
*B01D 46/10* (2006.01)
(Continued)

(52) U.S. Cl.
CPC ......... *B01D 46/0086* (2013.01); *B01D 46/10* (2013.01); *B01D 46/429* (2013.01);
(Continued)

(58) Field of Classification Search
None
See application file for complete search history.

(56) References Cited

U.S. PATENT DOCUMENTS 4,316,365 A 2/1982 Mueller et al.
5,001,463 A 3/1991 Hamburger
(Continued)

FOREIGN PATENT DOCUMENTS

JP H10-078253 3/1998
JP 2002-174445 6/2002
(Continued)

OTHER PUBLICATIONS

International Search Report, PCT/US2017/045508/, dated Oct. 18, 2017, 3 pages.
(Continued)

*Primary Examiner* — Christopher P Jones
*Assistant Examiner* — Brit E. Anbacht
(74) *Attorney, Agent, or Firm* — Kenneth B. Wood

(57) ABSTRACT

Devices, systems and methods for obtaining data representative of the condition of an air filter media of an air filter installed in a powered air-handling system, and for using such data to present an indication of the air filter media condition to a user. The devices, systems and methods use (Continued)

pressure information representative of at least a downstream pressure of the powered air-handling system.

14 Claims, 24 Drawing Sheets

(51) Int. Cl.
    *B01D 46/44*     (2006.01)
    *B01D 46/52*     (2006.01)
    *H04W 4/33*     (2018.01)
    *H04W 4/80*     (2018.01)
    *B01D 46/42*     (2006.01)
    *G01L 13/00*     (2006.01)
    *G01L 19/08*     (2006.01)
    *H04W 4/38*     (2018.01)

(52) U.S. Cl.
    CPC ......... *B01D 46/446* (2013.01); *B01D 46/521* (2013.01); *G01L 13/00* (2013.01); *G01L 19/086* (2013.01); *H04W 4/33* (2018.02); *H04W 4/38* (2018.02); *H04W 4/80* (2018.02)

(56) References Cited

U.S. PATENT DOCUMENTS

| | | | |
|---|---|---|---|
| 6,894,620 B2 | 5/2005 | Reinhardt et al. | |
| 6,993,414 B2 | 1/2006 | Shah | |
| 7,012,685 B1 | 3/2006 | Wilson | |
| 7,174,273 B2 | 2/2007 | Goldberg | |
| 7,244,294 B2 | 7/2007 | Kates | |
| 7,261,762 B2 | 8/2007 | Kang et al. | |
| 8,029,608 B1 | 10/2011 | Breslin | |
| 8,097,067 B2 | 1/2012 | Fox et al. | |
| 8,613,792 B2* | 12/2013 | Ragland | B01D 46/42 95/25 |
| 8,623,117 B2 | 1/2014 | Zavodny et al. | |
| 8,626,456 B2 | 1/2014 | Moore et al. | |
| 8,704,672 B2 | 4/2014 | Hoglund et al. | |
| 9,120,043 B2 | 9/2015 | Johansson et al. | |
| 9,200,995 B2 | 12/2015 | Ahola et al. | |
| 9,207,727 B2 | 12/2015 | Balogh et al. | |
| 9,481,004 B2 | 11/2016 | Vickers et al. | |
| 9,517,429 B2 | 12/2016 | Beier | |
| 9,552,715 B2 | 1/2017 | Breslin | |
| 9,593,861 B1* | 3/2017 | Burnett | F24F 11/30 |
| 10,512,873 B2 | 12/2019 | Stoner, Jr. | |
| 2002/0104967 A1 | 8/2002 | Kouznetsov | |
| 2005/0150304 A1* | 7/2005 | Gustafson | G01L 9/14 73/754 |
| 2006/0100796 A1 | 5/2006 | Fraden et al. | |
| 2007/0013534 A1 | 1/2007 | DiMaggio | |
| 2008/0190177 A1* | 8/2008 | Wiggins | B01D 46/0086 73/49.7 |
| 2008/0198896 A1 | 8/2008 | Nair | |
| 2009/0165644 A1 | 7/2009 | Campbell | |
| 2011/0185895 A1 | 8/2011 | Freen | |
| 2012/0318073 A1* | 12/2012 | Zavodny | B01D 46/42 73/862.581 |
| 2013/0036804 A1* | 2/2013 | Uehara | B01D 46/0086 73/114.31 |
| 2013/0197829 A1 | 8/2013 | Green | |
| 2014/0260994 A1* | 9/2014 | Grider | B01D 46/444 55/467 |
| 2014/0278681 A1 | 9/2014 | Cox et al. | |
| 2015/0052978 A1 | 2/2015 | Beier | |
| 2015/0260424 A1 | 9/2015 | Fadell | |
| 2015/0330857 A1 | 11/2015 | Henderson | |
| 2016/0045854 A1 | 2/2016 | Hung et al. | |
| 2016/0074801 A1* | 3/2016 | Francis | B01D 46/009 55/482 |
| 2016/0174146 A1 | 6/2016 | Wang et al. | |
| 2016/0184755 A1 | 6/2016 | Chen et al. | |
| 2017/0171607 A1* | 6/2017 | Britt | H04W 4/80 |
| 2017/0189844 A1 | 7/2017 | McLeod et al. | |
| 2017/0320004 A1 | 11/2017 | Allegorico et al. | |
| 2017/0361259 A1 | 12/2017 | Fox et al. | |
| 2018/0012479 A1 | 1/2018 | Seaton et al. | |
| 2018/0140989 A1* | 5/2018 | Arthur | B01D 46/521 |
| 2018/0221597 A1* | 8/2018 | Silver | A61M 13/006 |
| 2018/0290095 A1* | 10/2018 | Wei | B01D 46/0086 |
| 2019/0107302 A1* | 4/2019 | Liu | B01D 46/10 |
| 2019/0209957 A1* | 7/2019 | Silvestro | B01D 46/429 |
| 2019/0262756 A1* | 8/2019 | Arthur | H04W 4/33 |
| 2020/0256578 A1* | 8/2020 | Meis | B01D 46/00 |
| 2020/0340698 A1* | 10/2020 | Ben-Gal Nguyen | F24F 11/38 |
| 2021/0138376 A1* | 5/2021 | Annamalai | B01D 29/11 |

FOREIGN PATENT DOCUMENTS

| | | |
|---|---|---|
| WO | WO 2011/29574 | 3/2011 |
| WO | WO 2015/171571 | 12/2015 |
| WO | WO 2016/096786 | 6/2016 |
| WO | WO 2017/161530 | 9/2017 |

OTHER PUBLICATIONS

HVAC-Talk, http://hvac-talk.com/vbb/showthread.php?955362-Bryant-Evolution-Control-Question, date Jul. 31, 2017, 7 pages.

* cited by examiner

| Air speed (fpm) | Sensor dP (mbar) | Daffy dP (in H2O) | Calc dP Sensor (in H2O) | |
|---|---|---|---|---|
| 300 | 0.57 | 0.21 | 0.229 | A |
| 300 | 0.53 | 0.21 | 0.213 | A |
| 400 | 0.84 | 0.34 | 0.338 | B |
| 400 | 0.91 | 0.35 | 0.366 | B |
| 400 | 0.88 | 0.35 | 0.354 | B |
| 500 | 1.31 | 0.525 | 0.526 | C |
| 500 | 1.34 | 0.525 | 0.538 | C |

| HVAC mode | dP gauge (home) (inches H2O) | Sensor (mbar) | Sensor max. (mbar) | |
|---|---|---|---|---|
| Rheem Criterion | | | | |
| Fan ON | 0.51 | 1.07 | 1.09 | A |
| A/C ON | 0.46 | 0.91 | 1.11 | B |
| A/C + Fan ON | 0.47 | 0.85 | 1.11 | C |
| A/C Off, Fan ON | 0.51 | 1.03 | 1.11 | D |
| Off | 0 | 0.01 | 1.12 | E |

AIR FILTER CONDITION SENSING

BACKGROUND

An air filter may be included in furnaces and stand-alone air purifiers. Air is drawn through the filter, and the filter traps particles, preventing them from proceeding through ducts to environmental spaces that are being heated, cooled, or otherwise conditioned.

In-home furnace air filters become ineffective or blocked over time and need to be replaced to minimize wear on furnace fan motors as well as to maintain air purification effectiveness and maintain adequate airflow. Traditional filter obstruction is defined by the difference in pressure before the filter and after the filter in respect to airflow. An increase in the difference in pressure is indicative of the filter becoming more blocked and needing replacement.

SUMMARY

In broad summary, herein are disclosed devices, systems and methods for obtaining data representative of the condition of an air filter media of an air filter, and for using such data to present an indication of the air filter media condition to a user. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

DETAILED DESCRIPTION

Figure 1:
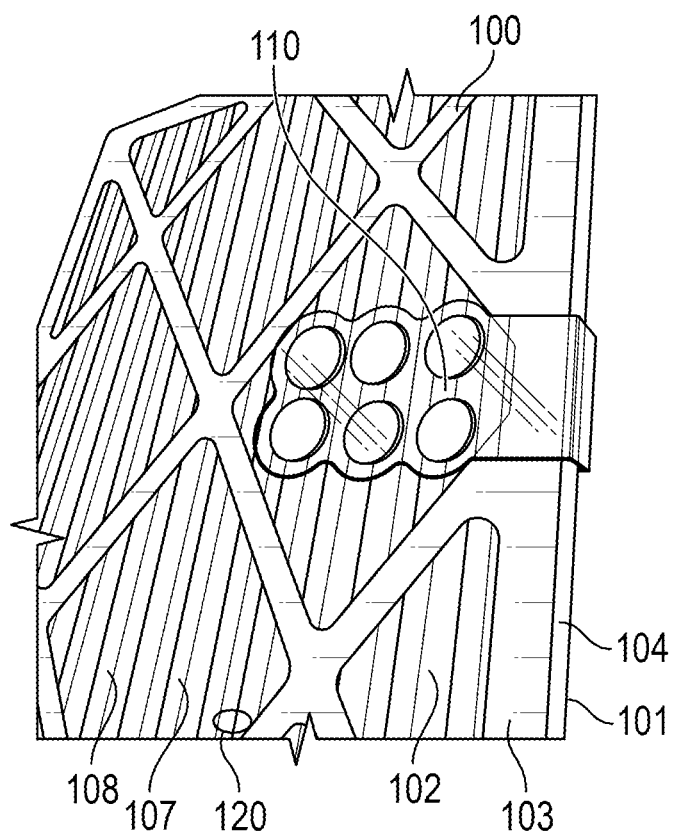
FIG. 1 is a photograph that includes a disposable air filter according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine. As will be evident from discussions later herein, while in some embodiments some such functions may be performed by circuitry that is co-located with a herein-disclosed sensor, in some convenient embodiments many such functions may be performed at a remote location from the sensor, e.g. in a mobile device or a cloud platform that is wirelessly coupled to the circuitry that is co-located with the sensor.

Embodiments are described to identify when an air filter should be replaced. The embodiments utilize sensors and analytics to determine if and when replacement of the air filter is desired. A network connection may be used to communicate an indication of filter which should be replaced. The indication may be provided to a user e.g. via an application running on a mobile device that receives the indication via the network. Information may be transferred based on a network connection such as a Bluetooth Low Energy (BLE) connection direction between a sensor and analytics device associated with the filter, a Wi-Fi connection, ZigBee, or Zwave for example. An RFID based connection or other connection may be used to transfer information in further embodiments. The application may enable ordering of a replacement filter either automatically or responsive to a user selectable option provided on the mobile device by the application. The application may also provide for reading a bar code, QR code, or other information from a filter and use such information to control use of the sensor on only specified filters. The information may also be used to configure the sensors and/or application for an allowed pressure drop or airflow measurement parameter for a corresponding filter.

In various embodiments, a single pressure sensor, or a multitude of different sensors, may be used to identify pressure obstruction of a filter. The single sensor may be positioned after the filter on the clean air side between the filter and fan side using a vacuum phenomenon created by the motor increasing effort as the filter becomes increasingly obstructed. In other words, the pressure drops while the fan is running, with the drop being greater as the filter becomes more obstructed. A threshold, such as a drop of 2 or more pascals while the fan is on compared to the fan being off, may be used to trigger customer notifications to replace the filter in one embodiment.

In one embodiment, the single pressure sensor provides pressure readings to analytics software executing on a processor. In some embodiments, the processor and pressure sensor may be formed as an integrated unit. For example, both such items may be located within a sensor housing (e.g., they may be supported on a common circuit board that is positioned within the housing). The integrated unit may also include networking capabilities. With the use of a single pressure sensor, the sensor may be calibrated by observing pressure with the fan on and the fan off. It may then be assumed that the pressure with the fan on is representative of the pressure difference between sides of the filter. Several examples of algorithms that utilize sensor data to generate notifications of filter obstruction are provided below.

Feedback may be provided to customers to communicate the effectiveness of air filtration filters as well as timing to replace and need to replace data. Previous concepts are susceptible to clogging by dirty air on the upstream side of the filter. Having to maintain two sensors also increases the sensor cost for the consumer. An affordable sensor can be provided to consumers to assist them in maintaining high air quality standards in their home through the appropriate servicing of their in-home furnace filter.

In a further embodiment, a differential pressure sensor may be coupled (e.g. physically attached) to the filter media with two openings on opposite sides of the filter media to communicate the pressure on each side to a differential pressure sensing element, such as a capacitor plate or piezoelectric element that flexes responsive to the difference in pressure. The sensing element may be located on one side with a first opening, with a tube with a second opening extending through the media to the other side of the media. The openings are disposed on either side of the differential pressure sensing element.

In further embodiments, at least one parameter other than pressure may be measured or sensed and correlated with a filter condition indicative of a time to replace the filter. Such parameters include for example, load on the fan motor, airspeed, turbulence, particulates, optical clarity, vibration, temperature of one or more wires, strain gage indicative of bending, and others. In still further embodiments, data from one or more sensors may be fused or otherwise combined by the analytics software to generate the indication for filter replacement.

In some embodiments, the sensor and/or integrated sensor unit may attach to or be integrated with the filter media, or attached to a frame of the filter media. The frame may be a permanent refillable plastic filter frame. In some embodiments, the unit may be attached to filter media or a frame of the filter and reused by removing the unit and attaching the unit to a replacement filter, filter frame, or filter media. The unit may also be attached to a frame of a filter having replaceable filter media.

In other embodiments, a sensor and/or integrated sensor unit may not be physically mounted on (e.g. attached to) an air filter but rather will be resident within the powered air-handling system. In such embodiments, such a sensor or sensor unit may be located at any suitable position within an air-handling system, e.g. on or within an air-return duct or plenum or an air-delivery duct or plenum of the system, on or within a blower cabinet of the system, and so on. Any such sensor or sensors may be positioned downstream from the air filter (i.e. on the "clean" side of the system), or upstream from the air filter, as desired. In some embodiments, a single sensor or integrated sensor unit may be used (e.g. on the downstream/clean side of the system), e.g. to provide an absolute pressure indication as discussed elsewhere herein. In other embodiments, two or more sensors or integrated sensor units may be used, e.g. one positioned upstream and one positioned downstream of the air filter, so that a differential pressure indication may be obtained. In specific embodiments, any such sensor or sensors may be installed in an air-handling system so that when an air filter is inserted into a designated receptacle of the air-handling system, the sensor(s) will be in a desired position (e.g. in close proximity, e.g. within a 10, 5, 2, or 1 cm) relative to the filter media of the air filter. Any such sensor may be installed in the air-handling system in any suitable manner. For example, a sensor may be bolted, screwed, or adhesively attached to a surface of a duct, plenum, panel, or cabinet of the system, or may be e.g. inserted into a fixture or holder provided for the specific purpose of holding the sensor.

FIG. 1 is a photograph that includes a disposable air filter 100. The filter 100 may have a generally rectangular shape (which includes square shapes). Disposable filter 100 may comprise an upstream face 101 (facing away and not visible) and a downstream face 102, and may comprise a filter media 107 surrounded by an optional perimeter frame 103. The filter media 107 may be replaceable by removing the filter media from the frame and replacing the filter media with new or reconditioned filter media. In further embodiments, the filter media may be self-supporting without a frame if formed with sufficient structural integrity to maintain an effective shape for filtering air when subjected to airflow. In various embodiments, filter media 107 may be pleated so as to exhibit readily identifiable pleats 108, or, it may be unpleated. In the depicted embodiment, a sensor 110, such as a pressure sensor, is supported by the filter. The sensor 110 may include electronics to process and communicate sensor readings indicative of filter media condition. The sensor may be supported by a hanging structure as shown at 110 in FIG. 1 or affixed directly to the filter media or frame.

Perimeter frame 103 may often comprise sidewalls (e.g., top, bottom, left and right sidewalls) 104 that define terminal edges of the framed filter. Frame 103 may be made of any suitable material(s), e.g., paperboard or cardboard that may be folded to provide the various sidewalls. In some embodiments, the frame 103 may be made of an injection molded plastic material. In some embodiments, at least the downstream face 102 of filter 100 may comprise support members that extend at least partially across filter media 107 (in any direction). Such members may provide additional support, particularly on the downstream side of the filter media; and (particularly for pleated filter media), such members may assist in minimizing or ensuring consistency of deformation of the filter media in response to air pressure during operation of the room air purifier. In some embodiments such members may be strips of paperboard that may be connected to frame 103 at their terminal ends. In other embodiments such members may be lengths of adhesive strands. If the filter media is pleated, any such adhesive strands may be deposited either before or after the filter media is pleated.

Many different types of filter styles with various pleating options may be used. For example, mini-pleat designs may use wire affixed to the pleat tips on one or both sides of the filter. Micro pleat designs may use wire on one side of filter media where the wire is contoured to the pleating of the media to maintain the pleat shape. Flat panel filter media may use wire and/or polyolefin netting. Some filter designs may use polyolefin strands versus adhesive strands to maintain pleat spacing.

The filter media 107 (whether pleated or not) of a disposable air filter 100 may be comprised of nearly any material, in any configuration, that is capable of filtering moving air. Such media may include, but is not limited to, fibrous materials (e.g., nonwoven webs, fiberglass webs, and so on), honeycomb structures loaded with filter media and/or sorbent material, and so on. In particular embodiments, the filter media may include at least one layer that comprises at least some material that can be electrically or electrostatically charged to form an electret material. In particular embodiments, the filter media may be a multilayer media that comprises at least one layer that includes an electret material, and at least one layer that includes a sorbent material. In some embodiments filter media 107 may comprise at least one layer capable of HEPA filtration. Electrostatically charged media may enhance particulate capture. Electrically charged media may be used in electrostatic precipitators which have a current and ground wire and are typically washable.

If at least one layer of the filter media 107 is to exhibit sorbent functionality, any suitable sorbent(s), in any convenient physical form, may be included in such a layer. In particular embodiments, such a sorbent may be capable of capturing formaldehyde (formaldehyde is a very light gas which may not be captured by typical carbon filters. Many carbon filters capture much heavier gases such as urea, cooking odors, etc. These filters use activated carbons. To capture Formaldehyde and toluene gases, a treated (often acid treated) carbon may be used. In some embodiments, the sorbent includes at least some activated carbon. If desired, the activated carbon may be treated to enhance its ability to capture formaldehyde. Suitable treatments may e.g., provide the activated carbon with at least some amine functionality and/or at least some manganate functionality and/or at least some iodide functionality. Specific examples of treated activated carbons that may be suitable include those that have been treated with e.g., potassium permanganate, urea, urea/phosphoric acid, and/or potassium iodide. Other sorbents that may be potentially suitable e.g., for removing formaldehyde include e.g., treated zeolites and treated activated alumina. Such materials may be included e.g., along with treated activated carbon if desired.

The one or more sorbents may be provided in any usable form; for example as particles, which may be e.g., powder, beads, flakes, whiskers, granules or agglomerates. The sorbent particle size may vary as desired. The sorbent particles may be incorporated into or onto a layer of filter media 107 in any desired fashion. For example, in various embodiments the sorbent particles may be physically entangled with fibers of a layer of filter media 107, may be adhesively bonded to such fibers, or some combination of both mechanisms may be used.

In one embodiment, disposable air filter 100 may include at least one RFID (radiofrequency identification) tag 120. In some embodiments, an RFID tag 120 may be mounted to any portion of a perimeter frame 103 of air filter 100. For example, an RFID tag 120 may be mounted to an interior major surface of a sidewall of the frame, or to an exterior or interior (i.e., visible or not visible) major surface of an upstream or downstream flange of the frame. In some embodiments, RFID tag 120 is mounted to (e.g., attached to, e.g., adhesively attached to) a major outward surface of a sidewall 104 of perimeter frame 103 of disposable air filter 100. RFID tag 120 may be any suitable RFID tag. In many embodiments, RFID tag 120 may be a passive tag, meaning that it does not include any kind of power source and is solely powered by the electromagnetic energy that is impinged upon it by the RFID reader. In some embodiments, RFID tag 120 may be a conventional RFID tag (operating e.g., at high, medium or low frequency) whose range is not particularly limited. In particular embodiments, RFID tag 120 may be a so-called Near Field Communication (NFC) tag, which will be recognized by the skilled person as being a particular type of RFID tag that operates (e.g., at 13.56 MHz) only over the range of a few (e.g., ten or less)

centimeters. In some embodiments RFID tag 120 is a readable (only) tag; in other embodiments it may be a readable/writeable tag. In some embodiments, RFID tag 120 may conveniently be supplied with an adhesive backing so that RFID tag 120 can be quickly and easily installed onto a surface of a sidewall 104 of a frame of filter 100.

In some embodiments, a powered air-handling system in which an air filter 100 bearing an RFID tag 120 is to be installed, may include an RFID reader which is configured to read information from the RFID tag of the air filter. In other embodiments an RFID tag of the air filter may be read by an RFID reader that is resident e.g. on a mobile device and that can communicate the thus-read information e.g. to an application that resides on the mobile device so that the information can be forwarded to a cloud platform. Information which may reside on such an RFID tag may include e.g. any or all of the following information preloaded (e.g., by the manufacturer of the filter) onto the RFID tag: model number; date of manufacture; date of expiration; the filter type, size, etc.; the rating of the filter; the lot number and/or serial number of the filter; and, authentication information. Further details of the use of an RFID reader of a powered air-handling system (in this case, an air purifier) in combination with an RFID tag of an air filter, are found in International (PCT) Patent Application CN2016/077210, entitled ROOM AIR PURIFIER WITH RFID READER, filed 24 Mar. 2016, and in the resulting US 371 National patent application Ser. No. _____, bearing the same title, both of which are incorporated by reference in their entirety herein. In some embodiments, the RFID reader (regardless of whether resident e.g. on a mobile device or on the air-handling system) may be configured to transmit at least certain information obtained from the RFID tag, e.g. to a cloud platform, through any suitable means.

In some embodiments, at least some information that is resident on an RFID tag of the air filter may be used in combination with data obtained from the at least one sensor as disclosed herein, to provide enhanced information that is representative of the condition of the filter media. For example, such RFID-tag-resident information might include information regarding the filtration characteristics of the filter media, in particular the degree to which that specific type of filter media has been found (e.g. in testing by the filter manufacturer) to exhibit an increased pressure drop upon being loaded with particles. Such information may be used to enhance the predictive capability of the arrangements disclosed herein regarding the useful life of the specific air filter in question.

It will thus be understood that in some embodiments, the arrangements and methods disclosed herein may involve the use of not just data (e.g. pressure data) as acquired by one or more sensors; rather, they may involve the use of such data in combination with information acquired by interrogation of an RFID tag of the air filter regarding the specific filtration characteristics of the air filter media in question. In some embodiments information such as the type and model number of an air filter might be entered e.g. via a mobile device application, which enable similar use of information regarding the filtration characteristics of the air filter in use. Or, an air filter might comprise a bar code which could be scanned by a bar code reader e.g. associated with a mobile device to obtain such information.

It will be appreciated that the use of e.g. an RFID tag (e.g. an NFC tag), a bar code or QR code, and so on, are all particular embodiments of a general approach in which information that is obtained from an information source that is locally-resident on an air filter, can be obtained by interrogation of a tag or other information depository located on the air filter, and can be used along with data that is acquired by a sensor that monitors the installed performance of that air filter, in order to achieve enhanced prediction of the filter life. In one such embodiment, the locally-resident information on the air filter need be interrogated/acquired a single time (since that information will be invariant), whereas the sensor acquires data on an ongoing basis. Of such approaches, the use of an RFID tag on an air filter in combination with an RFID reader that is resident on an air-handling system, can advantageously allow such information to be automatically obtained with little or no user action being needed beyond inserting the air filter into the air-handling system. However, any suitable arrangement within this general approach may be used as desired.

Figure 2:
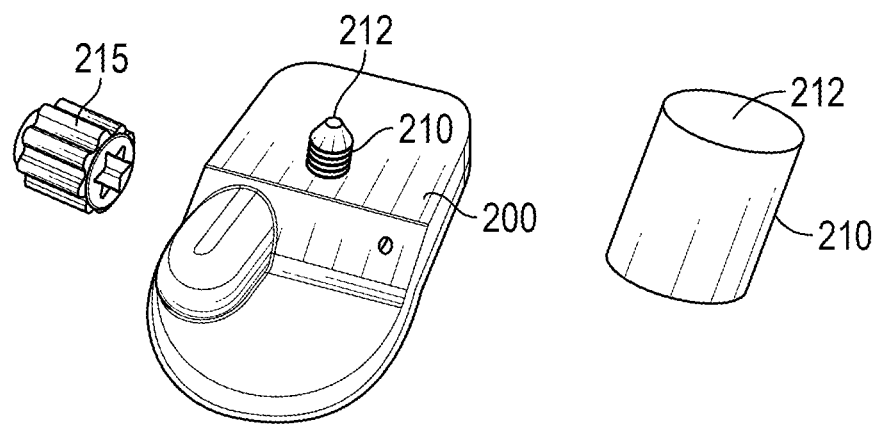
FIG. 2 is a photograph of a differential pressure sensor to couple to filter media according to an example embodiment.

In one embodiment, a single differential pressure sensor may be used and encased in a small plastic housing 200 as indicated in FIG. 2. The housing 200 may include one or more sensors to measure the differential pressure, processing electronics and Bluetooth Low Energy communication electronics. The pressure sensor(s) measures pressure drop of the filter in order to determine the filter's performance and when it should be replaced (i.e., the end of life for the filter).

In one embodiment, the housing 200 includes a tube 210 that is adapted to be pressed through the filter material from the fan side of the filter to provide a first opening 212 in the side of the filter receiving air to be filtered. In one embodiment, the tube 210 may be formed as a small sharp port that is used to puncture the filter media. A cap or locking nut 215 may fit over the tube and snap fit, friction fit, screw, or otherwise retain the housing in place to the filter while allowing communication of pressure via the first opening to one side of the differential pressure sensor within housing 200.

In some embodiments, the housing 200 with sensor or sensors may be reused on a new filter or filter media by removing the locking nut 215, removing the rest of the housing 200 from the filter and repeating installation on a new filter or filter media in the case of a filter frame allowing replacement of filter media. The housing with sensor or sensors may be installed on a filter frame and optionally reused.

A second opening, not shown, is positioned on the other side of housing 200 to provide communication of pressure from the fan side of the filter material to the differential pressure sensor such that the differential pressure sensor measures the pressure difference between the first and second openings.

It will be appreciated that such arrangements differ from configurations in which a sensor is provided as part of a housing or assembly that includes a bypass pathway with the sensor being configured to generate a signal in response to airflow through the bypass. Thus in at least some embodiments, the herein-disclosed arrangements do not include or rely on the monitoring of airflow through a bypass.

The processing electronics (in this case built into the sensor ICs) converts the pressure measurements into an electrical input signal (in this case digital) for the Bluetooth communications electronics. Thus in some embodiments, circuitry that is coupled to the sensor (e.g., that is co-located with the sensor on or in a housing) may serve solely to convert analog data that is outputted by the sensor, into digital data for wireless transmission. In other embodiments, such circuitry may perform additional processing of the data, e.g. it may perform a smoothing or averaging function. In still other embodiments, such circuitry may perform more significant manipulation of the data; e.g. it may use an algorithm to manipulate the data to generate an indication of the remaining filter life. Such an indication may be generated on the housing itself (e.g. by way of a visual or audible signal). However, in many embodiments it may be convenient that any such circuitry that is co-located with the sensor may merely serve to convert the data from analog to digital form (and optionally to store the data, as discussed below), with the digital data then being wirelessly transmitted elsewhere for the actual manipulation of the data to generate an indication of remaining filter life. In some embodiments, such manipulation may be performed e.g. on a mobile device or on a dedicated device that is installed in an air-handling system. However, it may be convenient for the digital data to be forwarded by such a device to a cloud platform which performs the actual data manipulation and then sends a resulting indication of remaining filter life to a notification unit. As noted, such a notification unit might be a mobile device (e.g. the same mobile device that communicated the digitized data to the cloud platform); or, it might be e.g. a display screen of a thermostat of the air-handling system.

In some embodiments the circuitry may be configured to store the digitized data for a period of time, rather than immediately wirelessly transmitting the data. This may reduce the power consumption and may be advantageous in cases in which the data is to be transmitted to a receiver (e.g. a smart phone) that may be within range of the circuitry intermittently rather than continuously. Moreover, in various embodiments the sensor may be configured to acquire data continuously, or intermittently. If data acquisition is intermittent, data (e.g. pressure data) may be taken at any desired frequency, e.g. a frequency no greater than once per thirty seconds or once per minute; no greater than once per five, ten, twenty, or thirty minutes; no greater than once per one, two, four, or eight hours; or no greater than once daily. In further embodiments such data may be taken at a frequency that is greater than once per week, once per day, once per ten, six, or three hours, or once per forty, twenty-five, or fifteen minutes. Such measures may advantageously reduce the power consumption versus e.g. a sensor and/or associated circuitry that is operated continuously.

In further embodiments, the processing electronics may be expanded to handle signals from other included sensors that provide air quality measurements (before and/or after the filter) in a facility or home, filter run time, humidity, etc.

The Bluetooth communication electronics can transmit the sensor information e.g. to a user's Bluetooth device (i.e., mobile device, smart phone, tablet, etc.) so that the user can monitor the filter's performance and know when to change the filter via one or more applications running on the device. In addition to monitoring application can be configured to notify the user when it's time to change the filter. (In some embodiments, such information may be transmitted to a notification unit such as e.g. a display device of the powered air-handling system itself, e.g. to a display screen of a thermostat that is used to operated the air-handling system, as noted above.) The sensor may be powered by a coin cell battery. This coin cell battery will be easily replaceable by the customer. Other types of batteries, including fuel cells and rechargeable batteries may be used in further embodiments. The battery voltage level may be displayed and a battery low alert may be provided to a user to notify a user to change the battery. In embodiments in which a sensor is provided at some location of an air-handling system (rather than being e.g. mounted on an air filter itself), the sensor may be hard-wired into the air-handling system. Or, such an air-handling-system-mounted sensor may be battery-powered.

Figure 3:
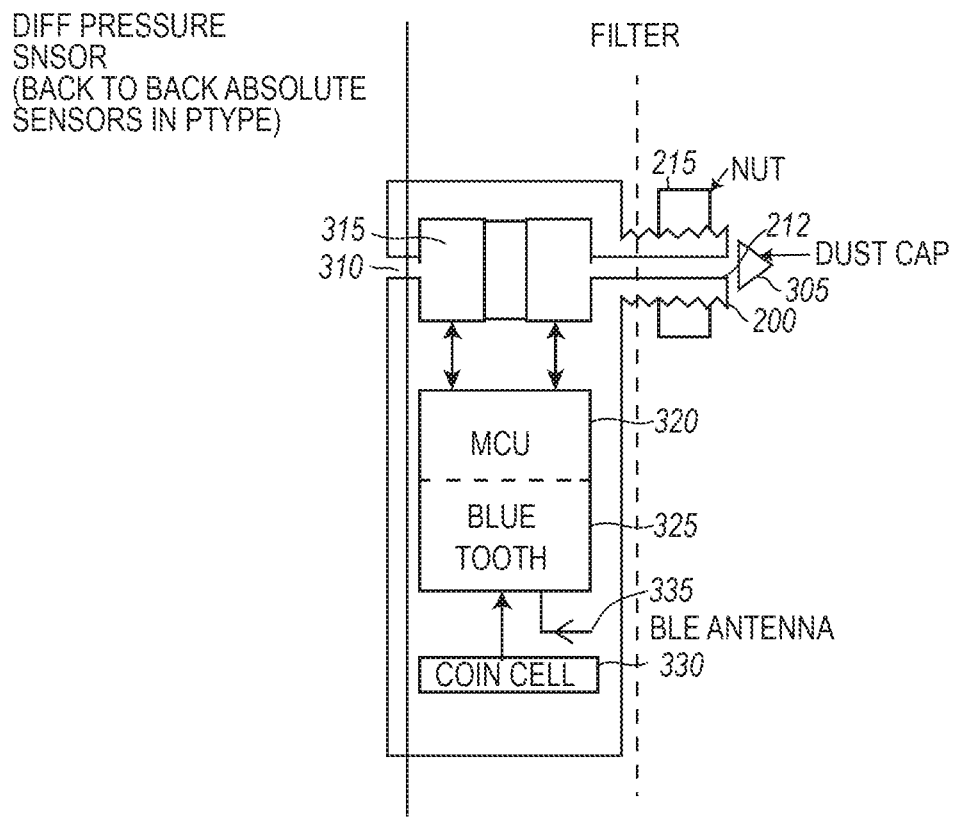
FIG. 3 is a block diagram of a filter with a differential pressure sensor according to an example embodiment.

A block diagram of an active air furnace filter sensor 300 is shown in FIG. 3. To prevent sensor clogging a small mechanical dust cap 305 may be molded onto the sensor nut 215. The dust cap 305 will prevent dust from clogging the sensor port. Sensor 300 may include a downstream opening 310, which in combination with an upstream opening 212 provides a pressure differential across a differential sensor 315, which in one embodiment may include back to back absolute pressure sensors, or a capacitive plate that flexes responsive to a difference in pressure across it, changing a capacitance of a circuit including the plate. A processor 320 may be programmed to receive sensed pressure data from the sensor 315 and perform analytics to determine the condition of the filter and generate alerts representative of such condition. A wireless circuity 325, such as a Bluetooth communication circuit may be used by the processor 320 to communicate via a wireless network connection. A battery 330 may be used to power the processor, sensor, and circuitry. An antenna 335 is also coupled to the communication circuitry 325 for transmission and reception of wireless signals.

Figure 4:
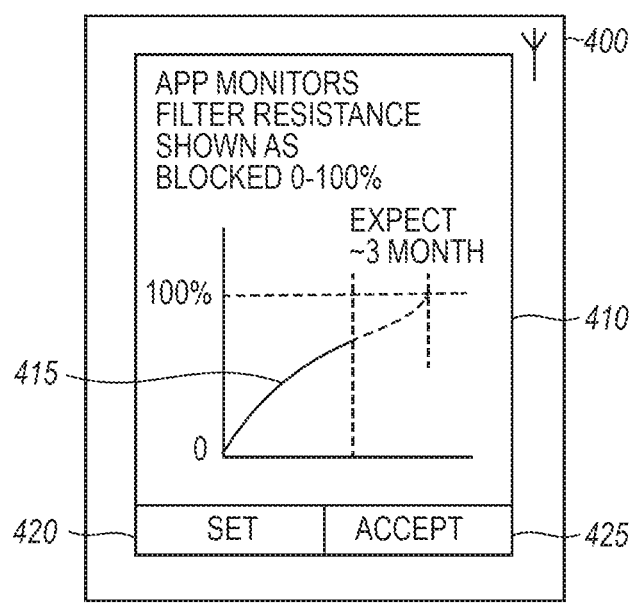
FIG. 4 is an illustration of a simulated user interface of an application running on a mobile device according to an example embodiment.

FIG. 4 is an illustration of a simulated, graphical user interface of an application running on a mobile device 400. The user interface in various embodiments provides an indication of the condition of a filter being monitored. The application receives communications from the sensor 300 representative of the condition of the filter and provides information to a user via the user interface indicated at 410. The user interface may include a graph 415 or other depiction illustrating filter performance, such as a line showing a percentage blockage of the filter, a percentage usage of the filter, and an expected time to replacement of the filter. The user may be provided with options, such as set 420 and accept 425. The options may include an option to automatically order a replacement filter at a time corresponding to a selected useful life remaining, or immediately upon determination that filter performance has deteriorated past a selected or determine threshold. The application may obtain replacement filter part information from the ID associated with the filter as described above via RFID or NFC reader, or even scanning a bar code or QR code on the filter. Alternatively, the ID associated with the filter may be communicated from the filter sensor to directly or indirectly to the device running the application via Bluetooth or other wireless communication protocol.

There are various methods which may be used to calibrate the filter sensor once it is installed in furnace system. Tests may be performed to determine the advantages and disadvantages of each calibration method.

Filter Sensor Calibration Method #1:
1. Install filter sensor in filter
2. Install filter into furnace system
3. Start device application
4. Push "Calibrate" button to set Differential Pressure=0
5. Start furnace
6. Press "Get Data" to take a Differential Pressure reading In some embodiments, the mobile device application may be used to scan a visible code or obtain information from the filter using RFID, NFC, or other wireless method to identify the filter. In some embodiments, the information necessary to identify the filter may be stored on the sensor and transmitted (directly or indirectly) to the mobile device. The identification of the filter may be used to check a table for proper settings to determine whether or not to notify a user that a filter should be replaced. If the filter identification is not proper, the app may be designed not to work with the filter. For example, the application may be configured to prevent a reset on a sensor that has already indicated the end of filter life. The application may store or access the sensor address and filter condition in memory and may prevent the user from pairing with a sensor that has been removed from a first filter and coupled to a second.

Filter Sensor Calibration Method #2:
1. Install filter sensor in filter
2. Install filter into furnace system
3. Start furnace
4. Start mobile device application
5. Push "Calibrate" button to set Differential Pressure=0
6. Press "Get Data" to take a Differential Pressure reading To check the performance and operation of the pressure sensing unit, two experiments were completed using the sensing unit on 1) lab scale hvac system and 2) an actual household furnace. The sensing unit was first placed in a lab scale HVAC system which has the ability to vary the blower speed, measure airflow rate, and measure pressure drop across the filter using a pressure transducer. With the ability to control the blower speed, this test was run using a wide range of airflow speeds to provide a range of sensor responses.

Figures 5A, 5B:
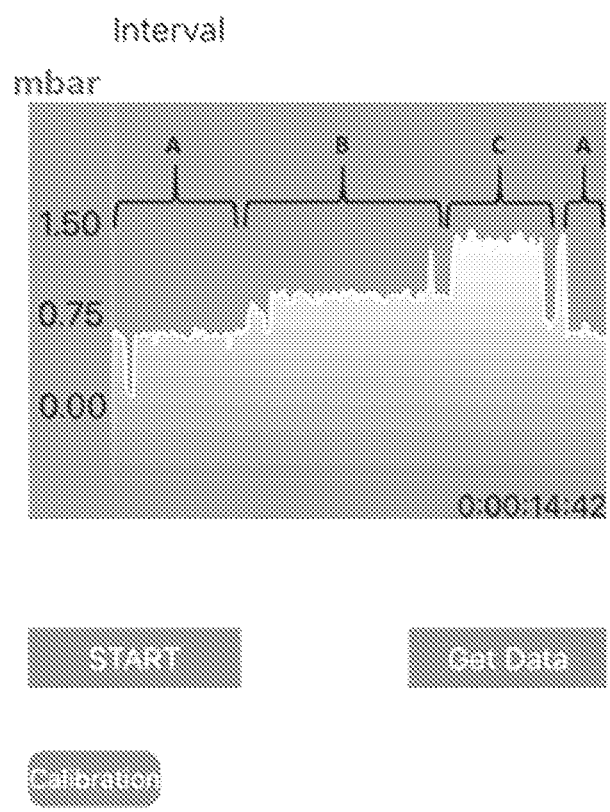
FIG. 5A is a table indicating blower speed in feet per minute, differential pressure sensor readings in millibars, duct pressure, a calculated pressure, and a letter, A, B, or C correlating results to a graph as shown in FIG. 5B according to an example embodiment.
FIG. 5B is a graph that illustrates the calculated pressure according to an example embodiment.

The sensor was mounted near the center of the filter and then installed into the filter holder and into the lab scale HVAC system. FIG. 5A is a table indicating blower speed in feet per minute, differential pressure sensor readings in millibars, duct pressure, a calculated pressure, and a letter, A, B, or C correlating results to a graph as shown in FIG. 5B that illustrates the calculated pressure. The blower speed was set to achieve a flowrate equal to 300 fpm (typical test velocity) through the filter. The test was allowed to run for several minutes to generate pressure drop data at steady state conditions. The blower speed was then increased to 400 fpm and 500 fpm to again measure the sensor responses at these higher airflow velocities. At each of the test velocities, pressure drop was recorded from the pressure transducer. The recorded pressure drop was then compared to the sensor pressure drop to establish a correlation on these responses.

Figures 6, 7:
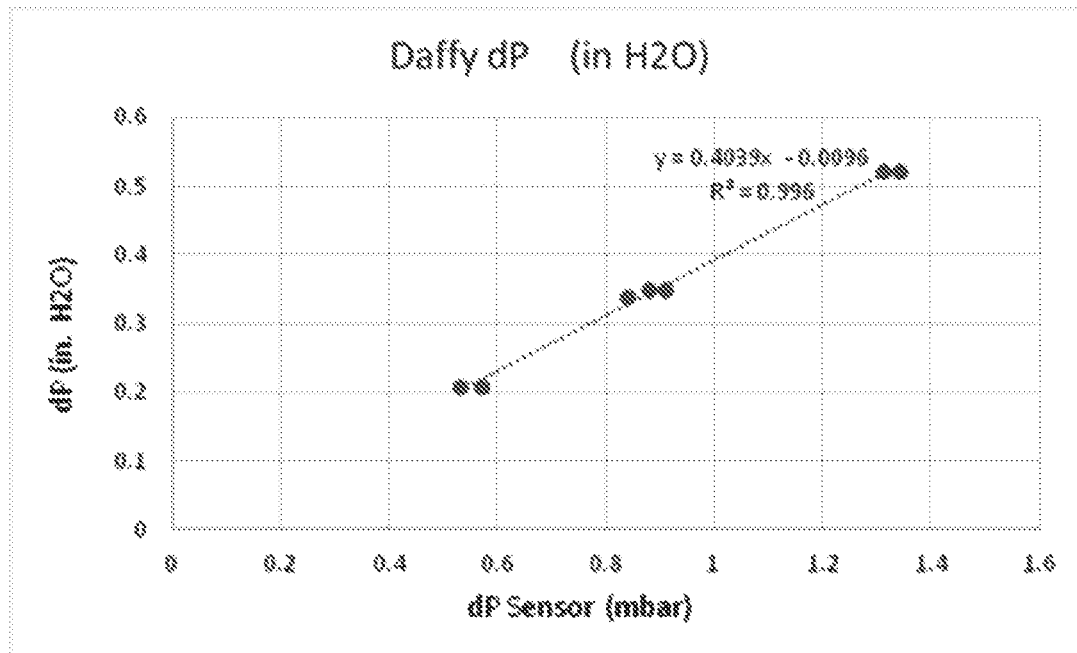
FIG. 6 is a graph comparing pressures obtained from a test with a blower running at different speeds according to an example embodiment.
FIG. 7 is a table similar to FIG. 5A according to an example embodiment.
Figure 8:
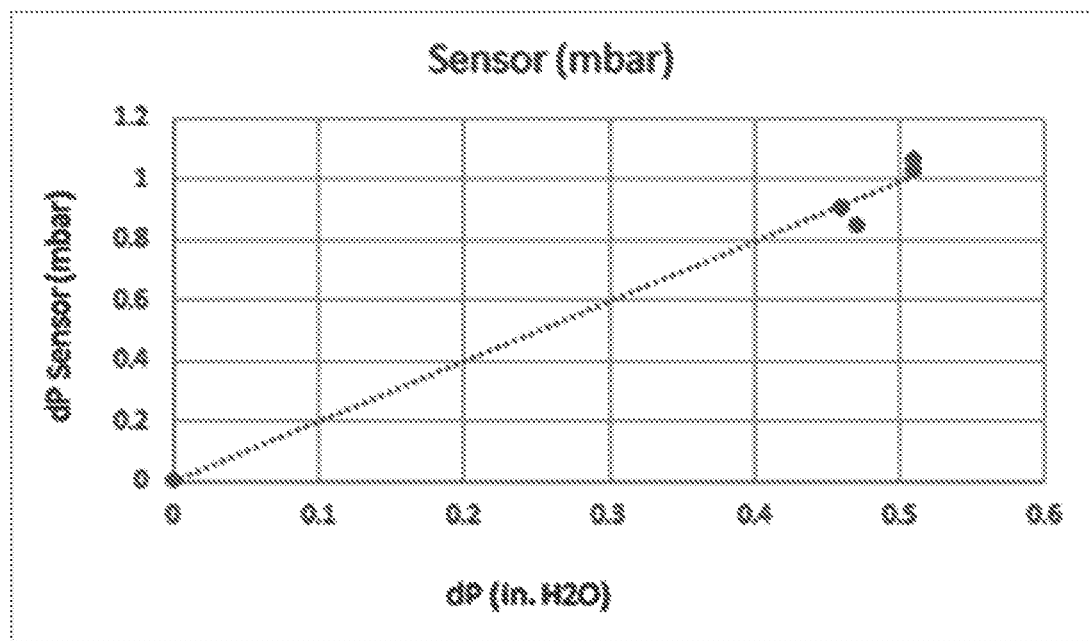
FIG. 8 is a graph comparing pressures obtained from a test with a blower running at different speeds according to an example embodiment.
Figure 9:
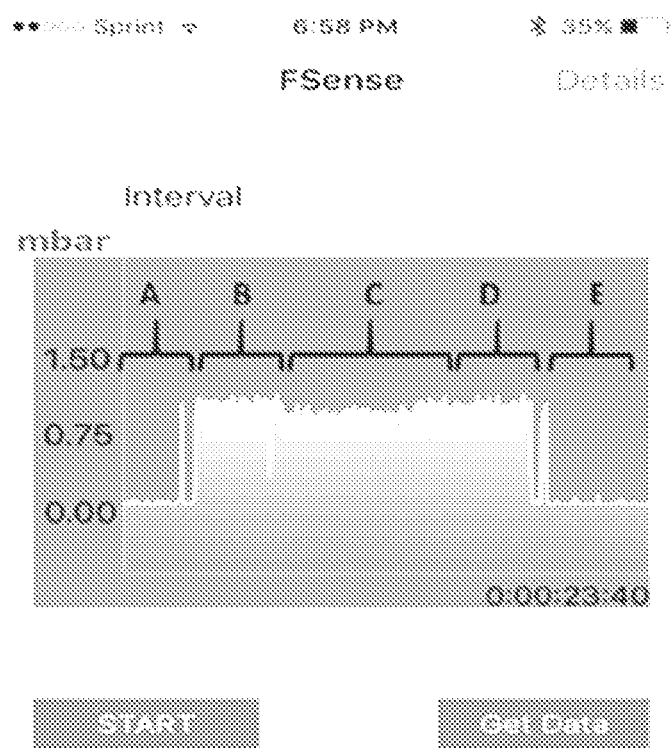
FIG. 9 is a graph showing pressures at different time intervals according to an example embodiment.

The results show a very good correlation between the lab scale HVAC system dP and the sensor dP (R$\wedge$2=0.996, see FIG. 6 illustrating a plot comparing the pressures.) FIGS. 7, 8, and 9 illustrate a further test with HVAC modes changed, including a fan on and off with both AC on and AC off. Letters are again used to correlate the test results in the table in FIG. 7 with a graph in FIG. 9. FIG. 8 is a plot comparing the pressures in a manner similar to FIG. 6. A significant pressure difference is noted with the fan and/or AC on. In one embodiment, improved sensor sampling may result with the use of a filter with a thru-channel or designed channel that reduces or eliminates turbulence of air flow. In one embodiment, the sensors may be placed perpendicular air flow, shielded from direct air flow, recessed to air flow, set to some other angle than perpendicular that improves the sampling, set backward, or may have self-cleaning capabilities.

Figure 10:
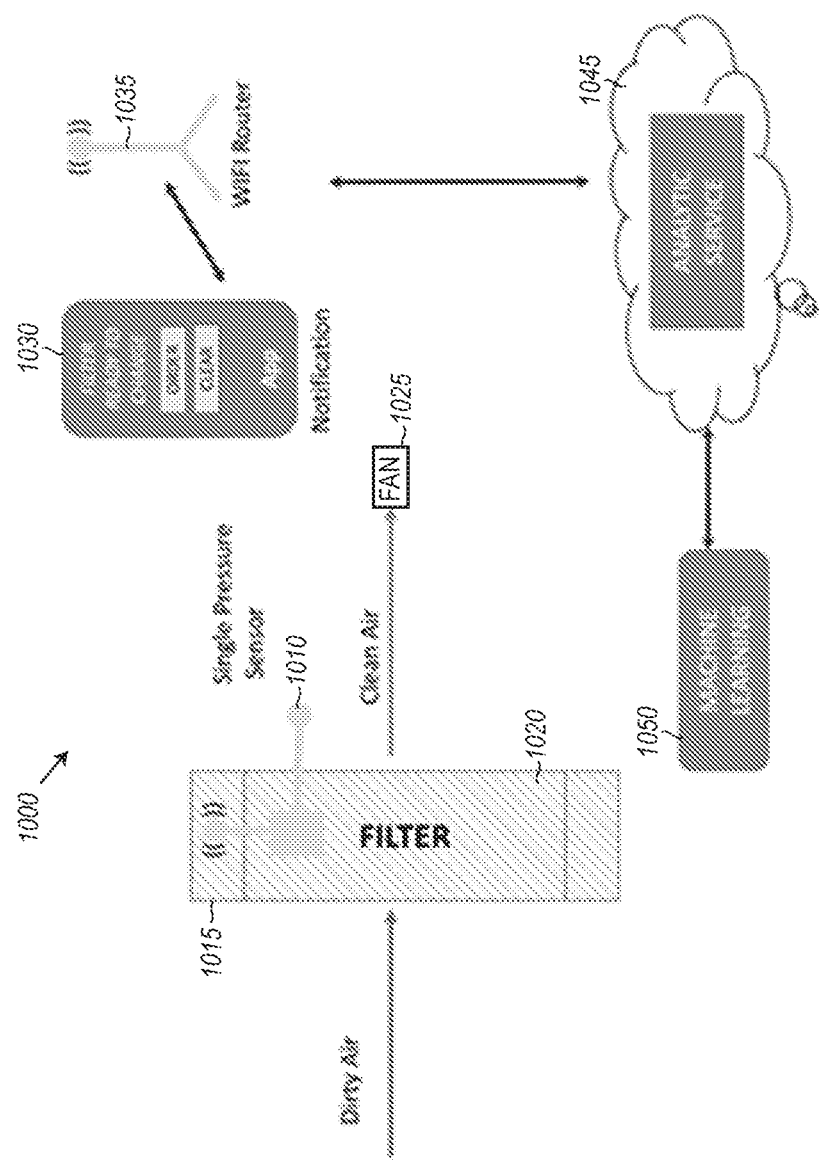
FIG. 10 is block diagram of a system for sensing obstruction of an air filter according to an example embodiment.

FIG. 10 is a block diagram of an exemplary device or system 1000 for sensing obstruction of an air filter according to an example embodiment. System 1000 includes a single pressure sensor 1010 on a clean side of a filter 1015. Sensor 1010 may be attached to the filter 1015, or may be positioned at any suitable location of the air-handling system, as long as it is able to provide pressure sensor or airflow capability on the clean side 1020 of the filter 1015 where the suction between the filter and a fan 1025 creates a pressure differential while the fan 1025, of the air-handling system is running. The pressure and airflow between the filter 1015 and the fan 1025 decreases as the filter becomes obstructed with contaminants as the filter is aged by use.

The device or system may be powered by a coin cell battery. A larger battery pack could also be used for longer life. Preferably a power harvester will be used to generate power and recharge the battery using airflow, vibration, heat differential or other means. Data may be provided with a frequency of updates of many times a minute. More frequent updates or sensor samples may be provided in further embodiments, or may be reduced in rate to conserve battery life based on an expected life of the battery as compared to the expected time until the filter becomes significantly obstructed such that replacement is recommended.

In some embodiments, the sensor 1010 may include an accelerometer. The accelerometer sensor reading may be in the form of units of movement. The pressure sensor is in Pascal Units or Inches of Water (delta P at 85 lpm of airflow). An airflow sensor (vane, thermoelectric, bending, vibration) can also act as a substitute for the accelerometer and/or the pressure sensor in combination to determine characteristics in airflow and pressure on at least one of the clean side and the dirty side of the filter.

The communication can be to a mobile device 1030 or to a Wi-Fi router 1035 or other radio device to uplink to a cloud platform. In some embodiments, the communication can be to a dedicated device that is resident in the air-handling system with which the air filter is used. For example, such a device (which may be hard-wired into the air-handling system, or may be battery-powered) may function in similar manner as a cellular phone but without being mobile or portable. Radio capability might include but is not limited to: ZigBee, Zwave, LoRa, Halo(new Wi-Fi), Bluetooth and Bluetooth BLE.

Data can be communicated directly to the application e.g. on the mobile device and/or directly to a cloud platform system 1045 via cellular connection, a Wi-Fi router or a hub. The sensors do not need to be calibrated before establishing a communication link. They can be calibrated during or after the initial activation of the device.

The device will self-calibrate using intelligent state management. The device may use an accelerometer or other sensor to identify when the furnace fan motor is off (reduced vibration or airflow) and when the fan motor is on (increased vibration or airflow). The off state will be used to calibrate and compare the device to the on state over time such as via a machine learning algorithm 1050.

Figure 11:
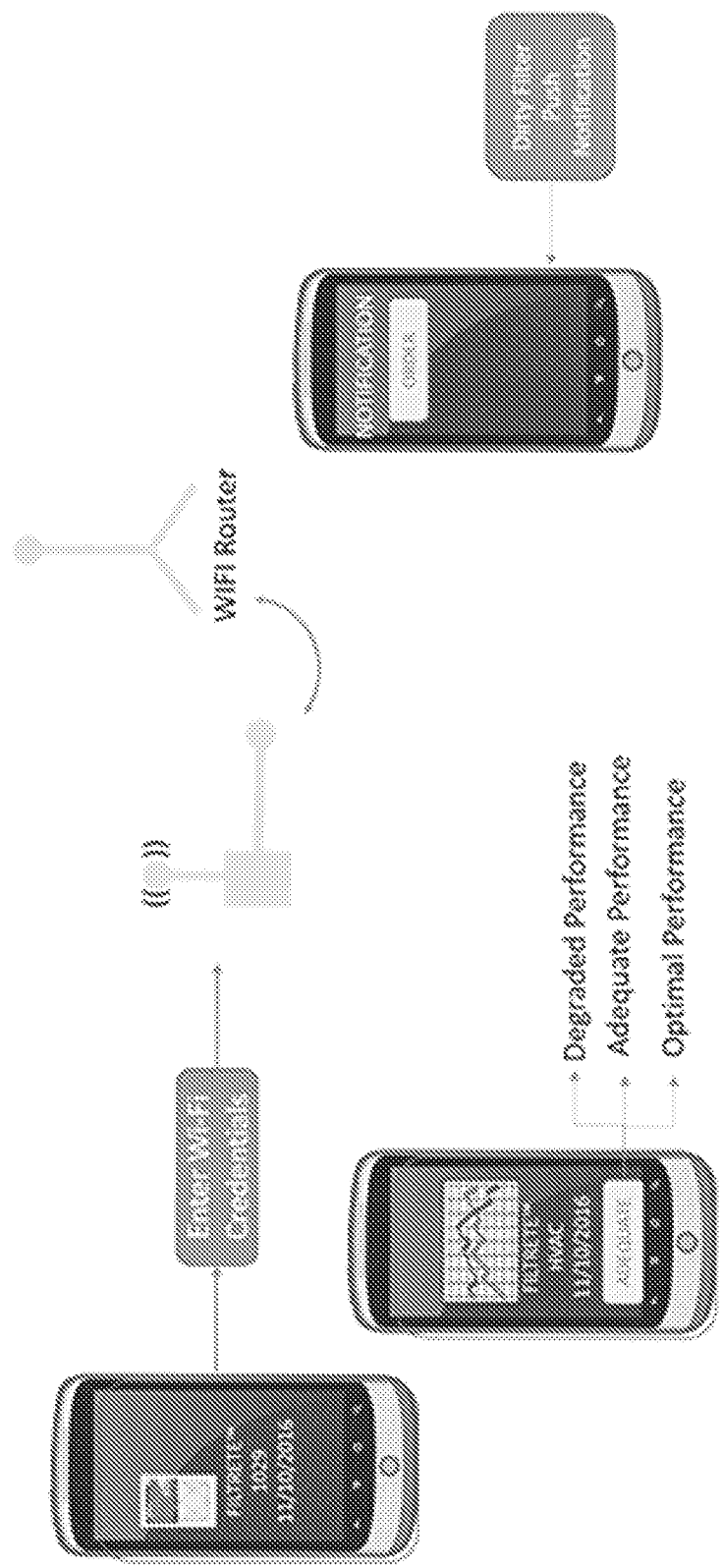
FIG. 11 is a block flow diagram illustrating configuration and use of a mobile device to interact with a filter sensor according to an example embodiment.

FIG. 11 is a block flow diagram of an exemplary arrangement illustrating configuration and use of a communication device (a mobile device, in the illustration of FIG. 11) to interact with the filter sensor. (By "filter sensor" is meant a sensor that is configured to obtain data representative of the condition of the filter media of the filter. This does not necessarily require that the sensor must be physically mounted directly on the filter itself, although this may be done if desired.) Pairing of the communication device with the filter sensor may occur, allowing entry of Wi-Fi credentials via the device. This may allow the filter sensor to communicate directly with a router within a home of a customer/user. Updates of data from the filter result in presentation of a user interface to the user that indicates at least one of performance (e.g., degraded performance, adequate performance or optimal performance) and remaining useful filter life. A notification may also be sent that a filter may be dirty, obstructed, or otherwise in need of replacement, which may be displayed e.g. on a mobile device or on a display panel of a thermostat of the air-handling system for the user to view, or may be programmed to automatically order a replacement filter or allow the user to select an option to conveniently order a replacement filter.

In some embodiments, specific user needs may be taken into account in the analytics that determine the need for filter replacement. A user may enter a profile indicative of specific medical conditions, such as pollen allergies or other respiratory conditions where higher than normal air quality may be desired. Such information may be used by the application to recommend a different filter, or to change thresholds for generating an indication of a filter in need of replacement. The ability to adapt to needs of the user may provide the user with a better overall experience and ease of use of the smart filter system, relieving them of having to more closely track the condition of a filter or save them from using a filter that is not capable of providing a suitable air quality needed for a better quality of life.

Figure 12:
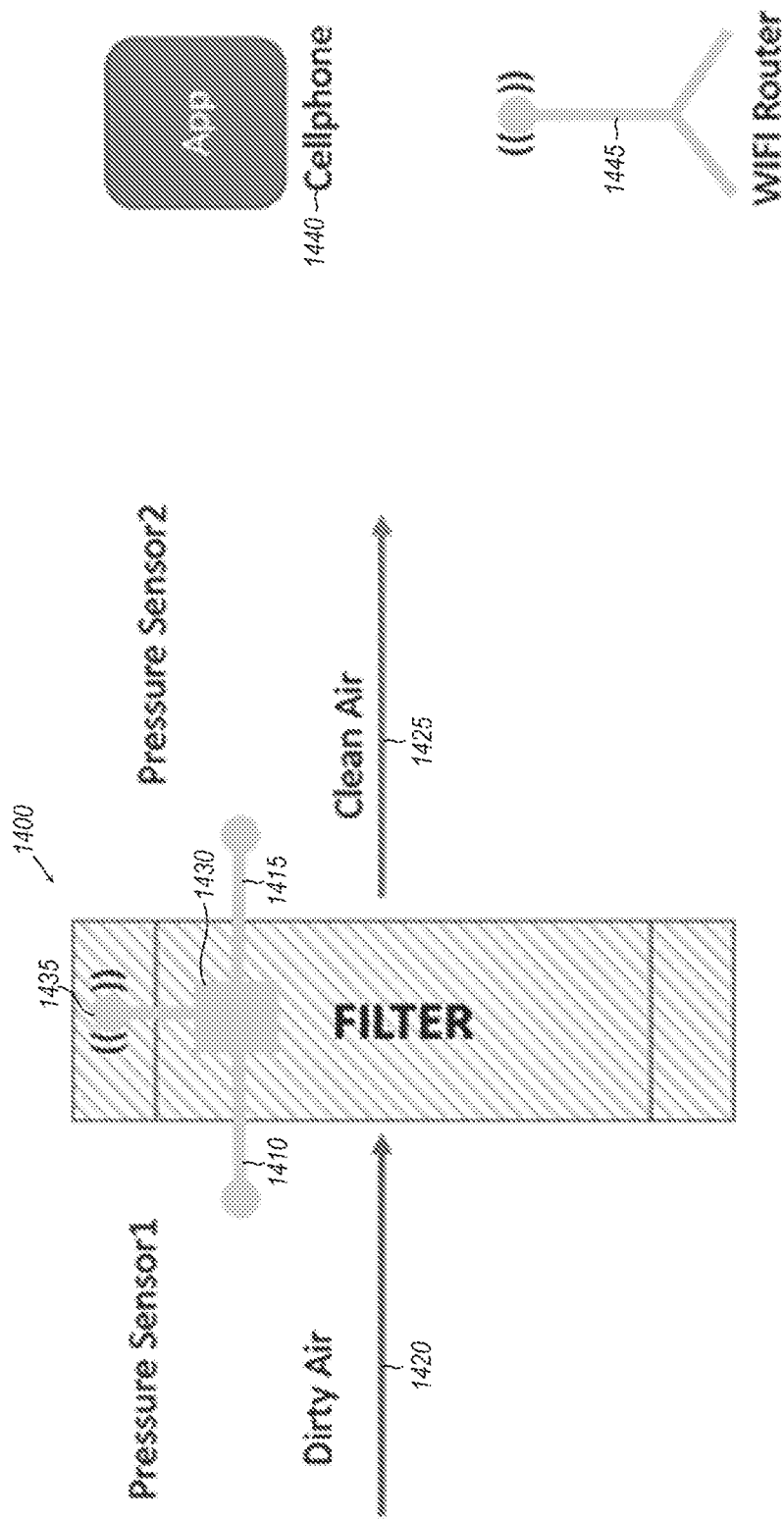
FIG. 12 is a block diagram of an example system utilizing two pressure sensors according to an example embodiment.

FIG. 12 is a block diagram of an example system 1400 utilizing two pressure sensors 1410 and 1415, one on each side of the filter. The use of two pressure sensors provides two independent pressure sensors to detect the air pressure before the filter (dirty side as indicated by dirty air arrow 1420) and after the filter (clean side as indicated by clean air arrow 1425). In one embodiment, the system includes two pressure sensors 1410, 1415, a circuit and/or logic 1430 that determines pressure difference as well as a radio (represented by antenna 1435) to communicate to cellphone 1440 via Bluetooth BLE, Bluetooth or Wi-Fi, indicated at router 1445.

In some embodiments at least one sensor (e.g. a pressure sensor) may be physically mounted on an air filter that is to be installed in a powered air-handling system. In other embodiments, the at least one sensor will be resident in the air-handling system, meaning that it is installed in the air-handling system but is not physically mounted on an air filter. In such embodiments, the sensor or sensors may be located in physical proximity to the air filter, or at least somewhat remote from the air filter, as desired. In some embodiments, such a sensor or sensors may be installed in the air-handling system at the time that the air-handling system is manufactured and/or installed. In other embodiments, such a sensor or sensors may be installed as an after-market item. For example, such a sensor might be provided by a provider of air filters, and might be configured for use with particular air filters. Such a sensor might be e.g. mounted to a surface of the air-handling system (e.g. to an inner surface of a duct, plenum, or blower cabinet of the system) as noted earlier. In particular embodiments, a single sensor may be used, e.g. on the clean side of (i.e., downstream from) the air filter. In other embodiments, two such sensors may be used, e.g. on upstream and one downstream from the air filter.

The arrangements herein allow any such sensor or sensors, and associated circuitry, processor(s), device(s), system(s), display(s), and so on, to be used with multiple filters in succession if desired. That is, rather than a sensor being provided on an air filter and then being discarded or recycled along with the used filter, such a sensor may be transferred to a new filter that is installed. Or, as noted above, in some embodiments such a sensor may be resident in the air-handling system itself, so that the sensor will remain in place in the air-handling system even after the air filter is changed. Any associated devices and systems may of course be configured to learn (e.g. by interrogation of an RFID tag of a newly installed air filter) of the insertion of a new air filter, upon which any necessary calibrations or the like may be performed as discussed herein.

A coin cell type battery may be used to provide power to system 1400. A larger battery pack or other type of power source could also be used for longer life. Data in the form of updates may be provided periodically, such as for example, once a minute. More frequent or less frequent updates or sensor samples could be provided as desired. Less frequent updates may help conserve battery life consistent with the length of time the filter is expected to function within desired parameters. The sensor reading in one embodiment is in Pascal Units or Inches of Water (delta P at 85 lpm of airflow). The communication can be to a cellphone or to a Wi-Fi router or other radio device to uplink to a cloud platform. Data may be communicated to the application directly on the phone and/or to a cloud platform system via the Wi-Fi router 1445. The pressure sensors do not need to be calibrated prior to use. In one embodiment, the pressure sensors may be calibrated during initial activation of the system.

Figure 13:
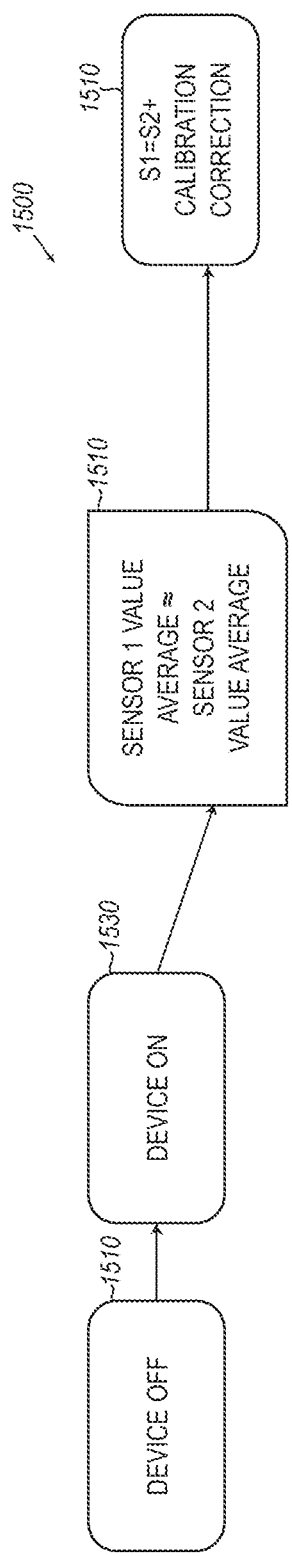
FIG. 13 is a block flow diagram illustrating calibration of pressure sensors according to an example embodiment.

In one embodiment, the two pressure sensors may be calibrated in the factory or in the initial setup relative to each other as indicated in a block flow diagram 1500 in FIG. 13. The calibration correction on the device will be represented by the equation S1=S2+Calibration Correction at 1510 when the airflow is zero. Calibration may be performed by reading pressures with the fan off at 1520 and the fan on at 1530. At 1540, the average values of the reading are determined for sensor 1 and sensor 2, and provided for calibration correction at 1510.

Example pressure sensors include: an AdaFruit BME280 I2c or SPI Temperature Humidity Pressure Sensor, an MPL3115A2-I2C Barometric Pressure/Altitude/Temperature Sensor (each available from Adafruit Industries, LLC) and the MPXM2010DT1 and MPXM2010D (available from NXP USA, Inc.). An exemplary, commercially available accelerometer is a LIS2DH12TR digital accelerometer from STMicroelectronics, Geneva, Switzerland. Any one of or both sensors may be off-the-shelf components that are readily commercially available.

Figure 14:
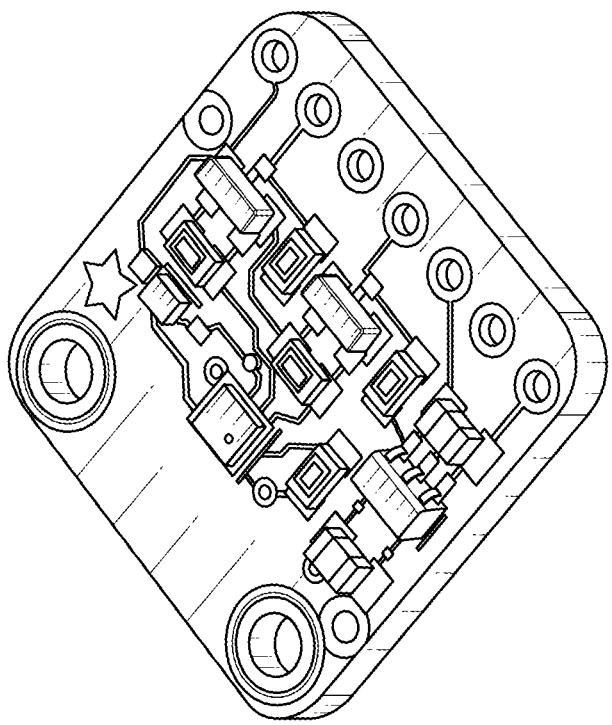
FIG. 14 provides information regarding an exemplary temperature and humidity sensor according to an example embodiment.

In a further example system, one or more sensors monitor pressure, air flow, air quality, temperature, humidity, distortion of the filter, airflow characterization and vibration on the clean and dirty side of the filter (before and after the filter). An example humidity sensor, an AdaFruit BME280 I2c or SPI Temperature Humidity Pressure Sensor, is shown in FIG. 14.

Figure 15:
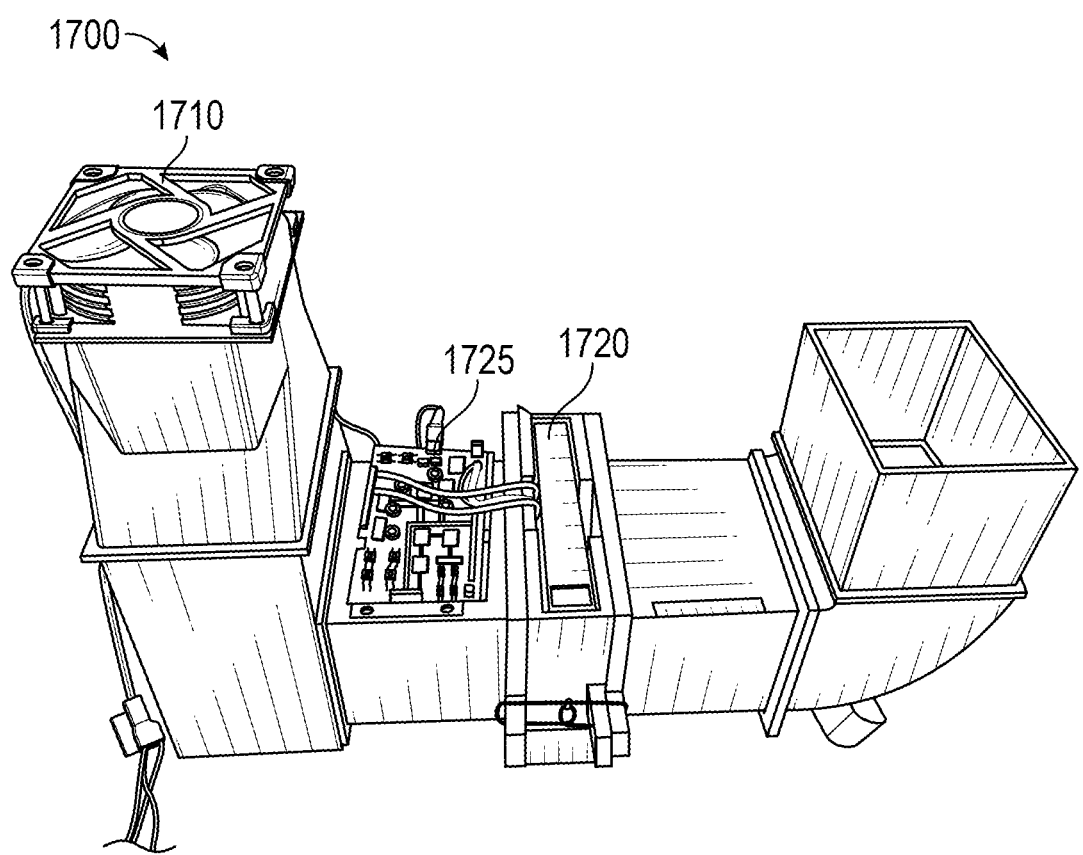
FIG. 15 is a photograph of an experimental system for testing a smart filter according to an example embodiment.

A lab scale furnace experimental system 1700 is indicated in FIG. 15, as an exemplary implementation of the herein-disclosed arrangements. A fan 1710 having a controllable fan speed draws air through simulated ductwork that has a filter 1720 in the center of the duct work and sensor circuitry 1725 in the form of a circuit board. The sensor circuitry 1725 receives data from one or more sensors measuring one or more parameters representative of filter condition and transmits the resulting information as described above. The sensor circuitry 1725 may implement an internet of things (IOT) application protocol to automatically upload and maintain data on a remote platform for real-time viewing, retrieval, and analysis.

Figure 16:
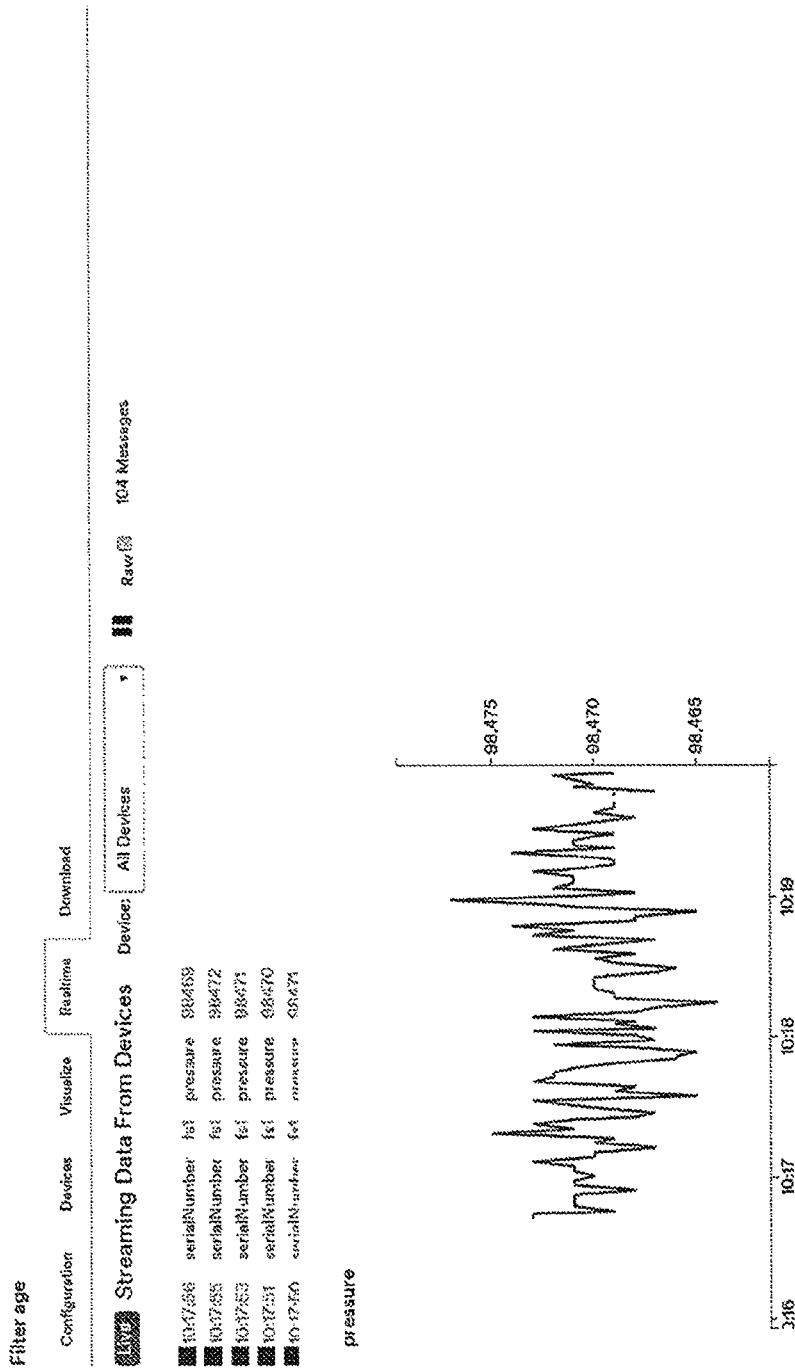
FIG. 16 provides representations of data streaming from smart filter circuitry according to an example embodiment.

FIG. 16 shows an example of data streaming from the circuitry 1725, which may be wirelessly coupled to a network via an internet of things protocol.

Figure 17:
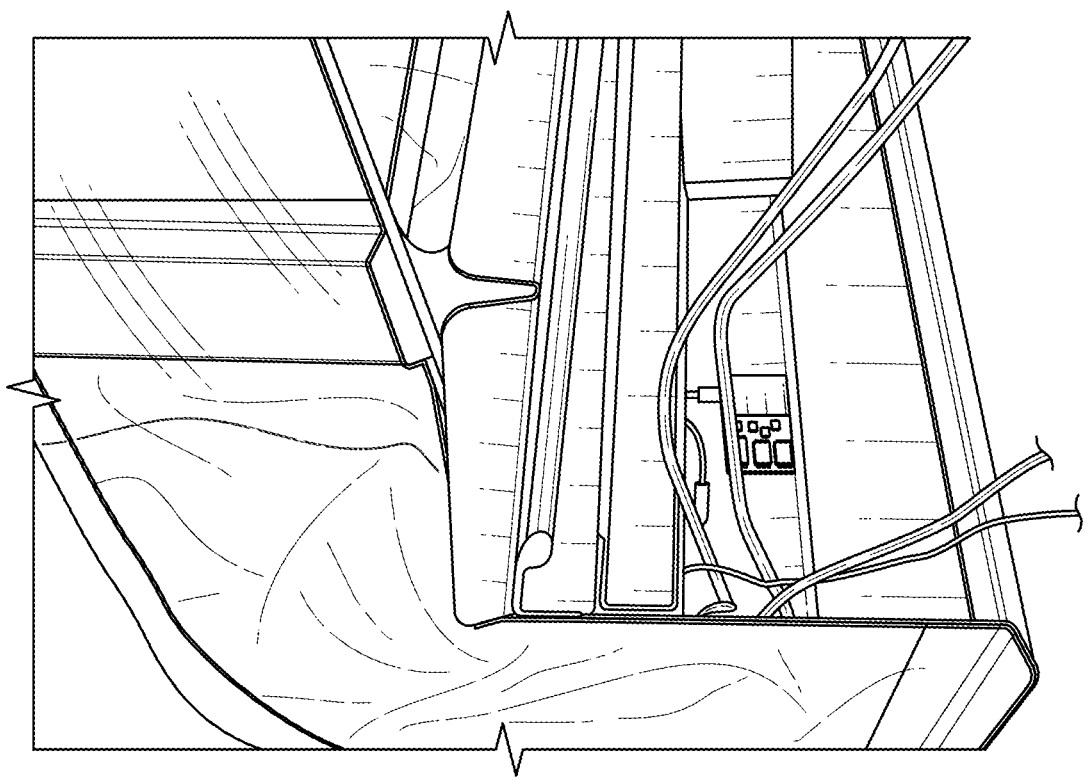
FIG. 17 is photograph of a filter installed in common home consumer furnace ductwork according to an example embodiment.

FIG. 17 is a picture of a filter installed in common home consumer furnace ductwork that provides a larger test environment, as another exemplary implementation of the herein-disclosed arrangements. Multiple sensors e.g. in the form of sensor packs may be installed before and after the filter. One sensor pack is visible in the space between the filter and motor for testing. There is a second sensor pack on the left before the filter (for testing/calibration). A Wi-Fi signal is able to penetrate the metal furnace without issue in this configuration with the plugged in sensor pack. The sensor pack may for example be a Raspberry Pi3 with a "sensor hat" that is connected to power to provide a very rapid sampling rate for high resolution test data. The data is being uploaded to an IoT Platform. Initial tests indicated that the sensors are able to pick up the pressure difference before the filter and after the filter. The sensors may be run over several days a "clean" filter to determine the variance and sensitivity of the sensor over a longer period of time.

Figure 18:
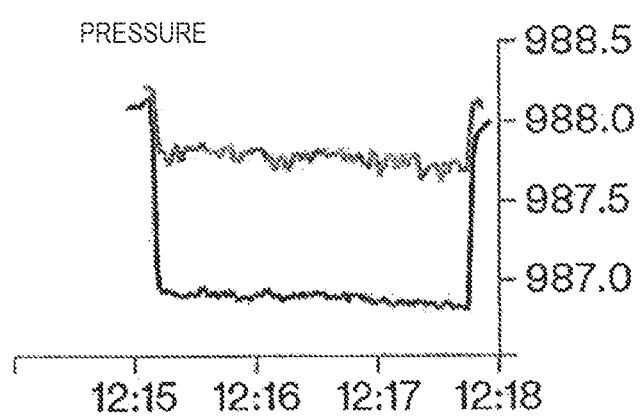
FIG. 18 is a graph illustrating the difference in pressure across a filter with the fan first off, then on, then off again according to an example embodiment.

FIG. 18 is a graph illustrating the difference in pressure across a filter with the fan first off, then on, then off again. When the fan is off, the difference in pressure is negligible if not zero. The top line represents data from the sensor upstream of the filter and the lower line represents data from the sensor downstream of the filter. Note that when the furnace is off at the beginning of the graph and also at the end of the graph, the two lines rejoin.

Figures 19, 20:
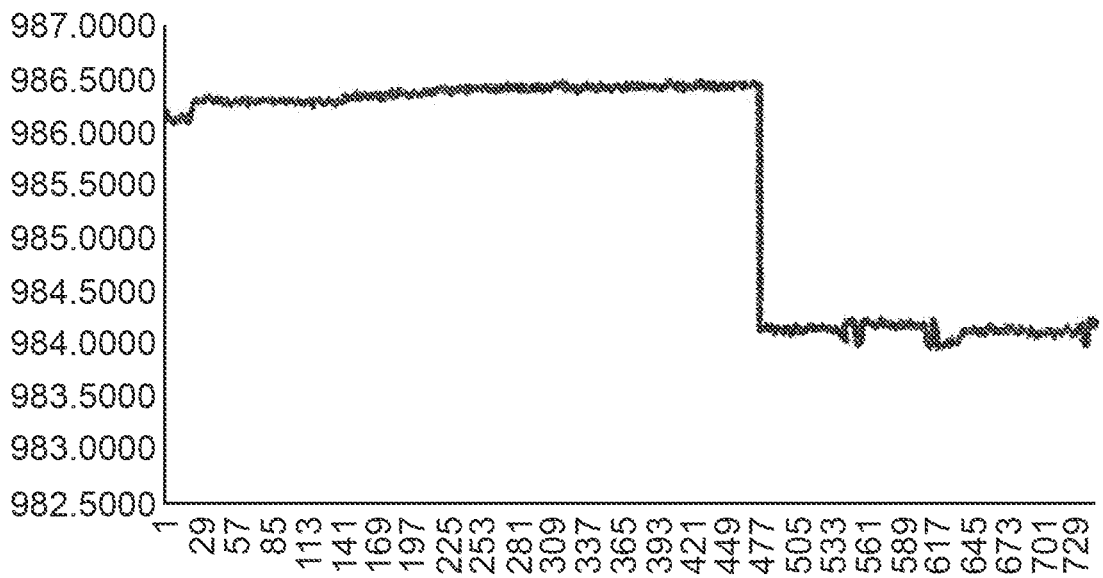
FIG. 19 is a table indicating information transmitted and collected during operation of a system including a smart filter according to an example embodiment.
FIG. 20 is a graph indicating readings from a single downstream side pressure sensor with the furnace or fan off, and then on, where the filter is known to be dirty and in need of replacement according to an example embodiment.

FIG. 19 is a spreadsheet based table indicating information transmitted and collected during operation of a system including a smart filter.

"States" of operation are identified for the furnace at the point of the individual sensor unit being initiated with a filter change. These states include:

Furnace Off—The furnace assumes the pressure level of the ambient air while having a low level of vibration.

Furnace On Clean Filter—The clean side sensor establishes a level of pressure.

Furnace On Variation 1 . . . n—The furnace establishes several potential regular "states" as it runs over time. These states are established during the 2 month phase of the filter in use.

Furnace On Dirtying—Levels of obstruction are determined relative to the Furnace On Variation states established during the first two months.

Furnace Filter Needing Changing—Is established when the furnace filter reaches a predetermined state, such as for example, an average of 1.5 pascals of pressure less than that of a previously established state or 3.25 months has been reached during Furnace On relative to any state.

The data file from a first Experiment 1 on the full-sized furnace was reviewed with the following averaged results as follows.

Before Filter-Pi Serial Number 43-off calibration Average 986.3636
After Filter-Pi Serial Number 36-off calibration Average 986.3614
Before Filter-Pi Serial Number 43-clean running Average 986.2444
After Filter-Pi Serial Number 36-clean running Average 985.8823
Before Filter-Pi Serial Number 43-unknown dirty Average 986.0958
After Filter-Pi Serial Number 36-unknown dirty Average 985.2246
Before Filter-Pi Serial Number 43-dirty 0.74 Average 986.1727
After Filter-Pi Serial Number 36-dirty 0.74 Average 985.2684
Before Filter-Pi Serial Number 43-dirty 1.54 Average 986.3910
After Filter-Pi Serial Number 36-dirty 1.54 Average 984.1002

Initial results demonstrate the ability of low cost sensors being able to establish the pressure differential between the before filter and after filter sections of the furnace. The results also suggest the ability of a system to establish states over time with one or more sensors effectively. The "furnace off" state would allow for one or more sensors to calibrate relative to atmospheric pressure changes as well as furnace configuration changes over time.

Algorithm Method

A system including one or more pressure sensors in addition to accelerometer sensors can establish states of the furnace over time:
S0-Filter Installation-Furnace Off
S1-Filter Clean-Furnace On
S2 . . . n-Self Characterized States within Month 1-2
Sr-In Need of Replacement-Characterized by an average change of 2+ pascals difference from S0 or from pre-filter pressure sensor while in the on state relative to S0 or 1.5+ pascals as compared to any of S2 . . . n Self Characterized States.

Since different type of sensors that sense different parameters that may be directly representative of filter media condition may be used in different embodiments, a more generic algorithm may include similar steps that are not limited to the use of only pressure sensors. The "in need of replacement" thresholds may be based on a change in airflow, a change in motor loading, changes in vibrations, and other parameters sensed by appropriate sensors as described in further detail below.

Additional Methodology Detail

State Value—The value of a state is calculated via a multistep process. The primary deterministic state is the condition of the furnace being on or off. The second step is a stabilization period, such as a delay of two minutes after the furnace turning on or off for airflow, vibration and pressure stabilization. The third step is to gather data for a period of time (e.g., two minutes). Outlier data of 2× the moving average is removed and the moving average for the period is established for the after filter pressure sensor. Vibration (accelerometer data) can be used to further determine the on/off state of the furnace. Initial experimentation suggests that a single sensor can be used for this determination.

Additional Contributing Factors

Room air pollution information (particulates and other contaminates) can be used to improve the accuracy of the need to change air filtration media.

Metadata/General Survey Information—Smoking, use of candles, ownership of pet information can be used to inform the algorithm to more aggressively determine change.

General Building Configuration—Windows open/closed, carpeting as well as other information can be used to inform the algorithm.

Outdoor Air Pollution—Information can be gathered from air quality monitoring sites to determine aggressiveness of replacement.

Analytics may be used to filter and provide air quality advice, furnace status and filter replacement status throughout the life of the filter. The system may be powered by a coin cell battery. A larger battery pack could also be used for longer life. A power harvester may be used to generate power and recharge the battery using airflow, vibration, heat differential or other means. Other power sources and storage methods can be used as needed. The system may provide updates at various time intervals, such as many times a minute. More frequent updates or sensor samples could be provided. Frequency of updates may be controlled by air movement.

Air pressure may be measured before and after the filter to be able to determine pressure difference. Multiple sensors may be used to correct for failure of individual sensors. Filaments and airflow sensors may be included to provide a map of air turbulence within the air chambers before and after the filter. The air turbulence information can be used to determine obstruction or sub optimized performance of the filter or furnace controls.

Air quality may also be monitored before filter and after filter to provide particulate and non-atmospheric gas values to monitor filter performance and air quality before and after treatment. Air quality monitors/sensors may also be disposed outside the HVAC system and within the building or home. Air temperature in the air stream may also be monitored. Air humidity in the air stream may also be monitored. Strain sensors may be used to monitor the distortion of the physical filter shape during the life of the filter. Strain gauge capability may be woven into the filaments of the filter.

Directional (gyroscopic) and non-directional (accelerometer) measurements may be provided by sensors to understand vibration which may result in relative strain within the components of the furnace system. Communication capabilities may be included to provide information to a mobile device such as a cellphone or to a Wi-Fi router or other radio device to uplink to a cloud platform. Radio capability might include but is not limited to: ZigBee, Zwave, LoRa, Halo (new Wi-Fi), Bluetooth and Bluetooth BLE. Data, including notifications, can be communicated to an application directly on the mobile device and/or to a cloud platform system via the Wi-Fi router. Note that the sensors do not need to be calibrated beforehand. They can be calibrated in the initial activation of the device.

FIG. 20 is a graph indicating readings from a single downstream side pressure sensor with the furnace or fan off, and then on, where the filter is known to be dirty and in need of replacement. Note that the pressure changes by more than 2 pascals, moving from almost 986.5 pascals when off to less than 984.5 pascals when on. By recording pressure both when the fan is on and off, the difference may be found by subtraction. Comparison to a threshold of 2 pascals indicates that the threshold has been exceeded based on the data shown in FIG. 20.

The pressure in uncalibrated pascals (low cost sensor) is on the left (Y-axis) (982-987) over time with the time increments on the X axis. The sample experiment data shows the off state changing from a high pressure of 986.5000 to approximately 984.0000 when the furnace is turned on. The pressure differential is produced by the difference in ambient air pressure (approximately 986) is obstructed by the fan operation of the furnace fan behind the obstructed fan which produces an air pressure reduction to approximately. 984.

A single pressure sensor can be used to determine furnace state (on or off) by the rapid nature of the pressure change. Atmospheric pressure change occurs more slowly. The on/off periods are used to determine the comparator for the determination of the state Sr (need to change the filter).

Figure 21:
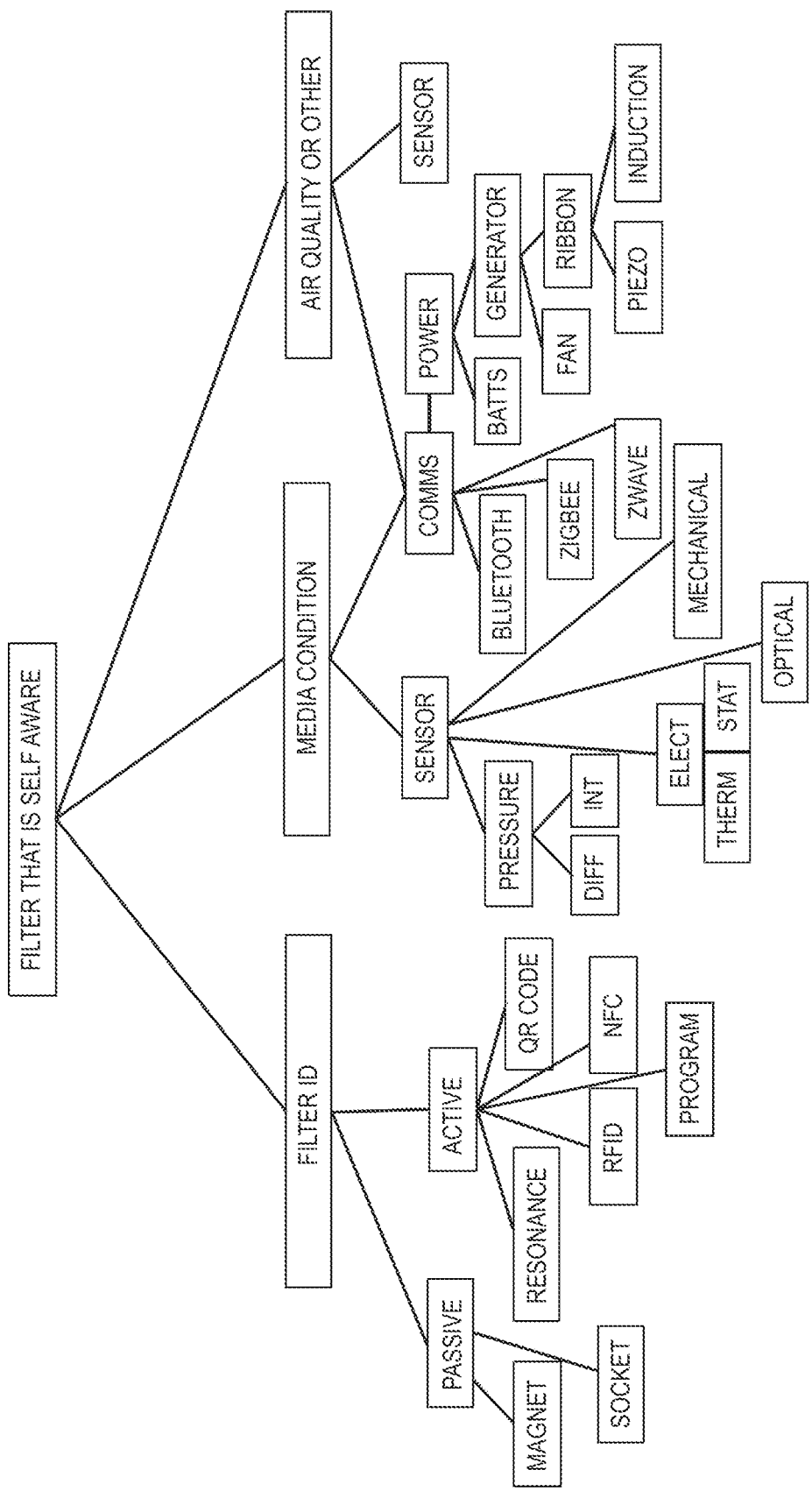
FIG. 21 is a block diagram representation of a smart filter with various options for providing an ID of the filter, sensing the filter media condition, and optionally sensing air quality according to an example embodiment.

Several different example embodiments have been described above. FIG. 21 is a block diagram representation of a smart filter with various options for providing an ID of the filter, sensing the filter media condition, and optionally sensing air quality. Further details regarding the options is provided with a discussion of FIG. 22.

Figure 22:
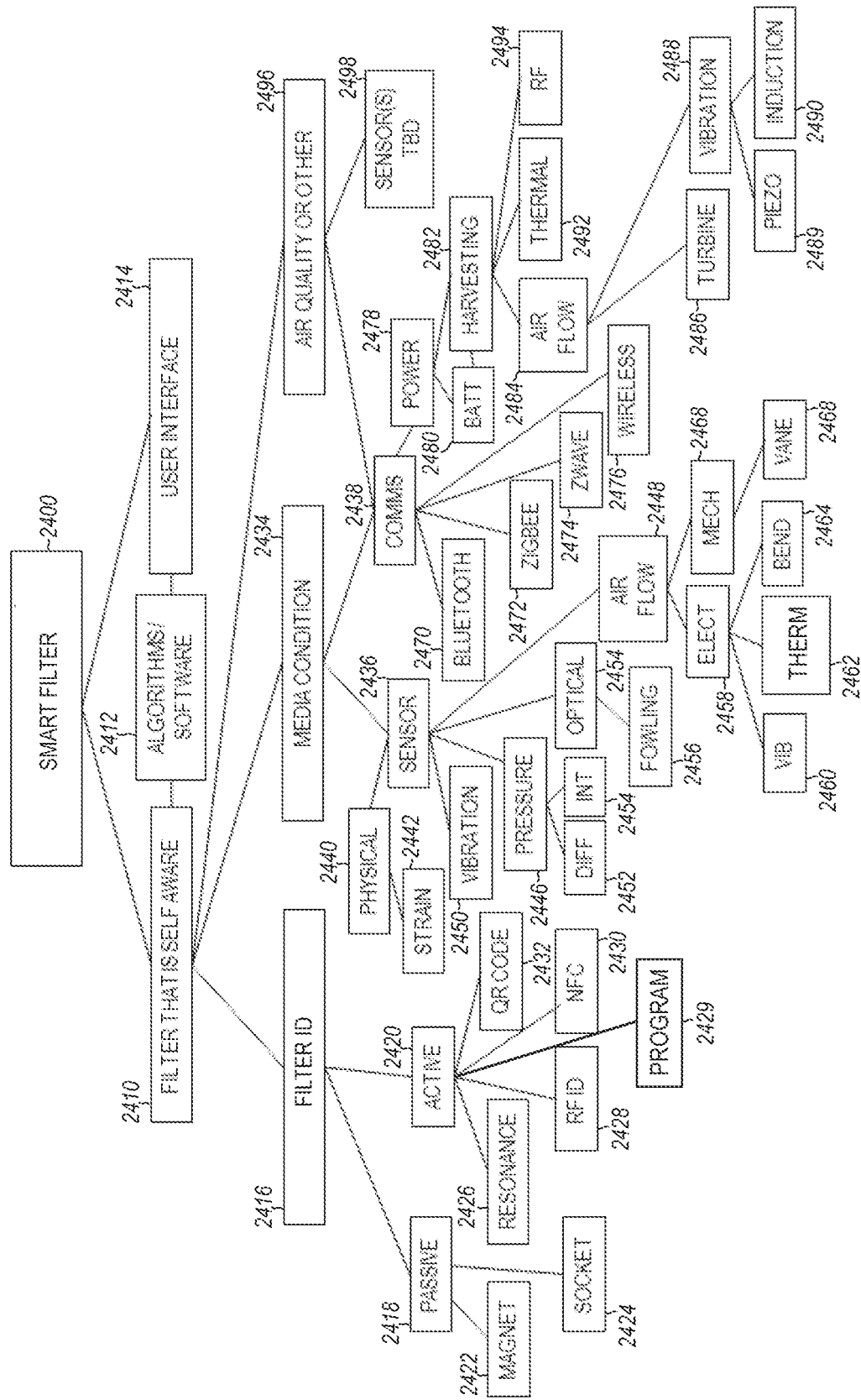
FIG. 22 is a block diagram representation of multiple elements and alternative elements in a smart filter system according to an example embodiment.
Figure 23:
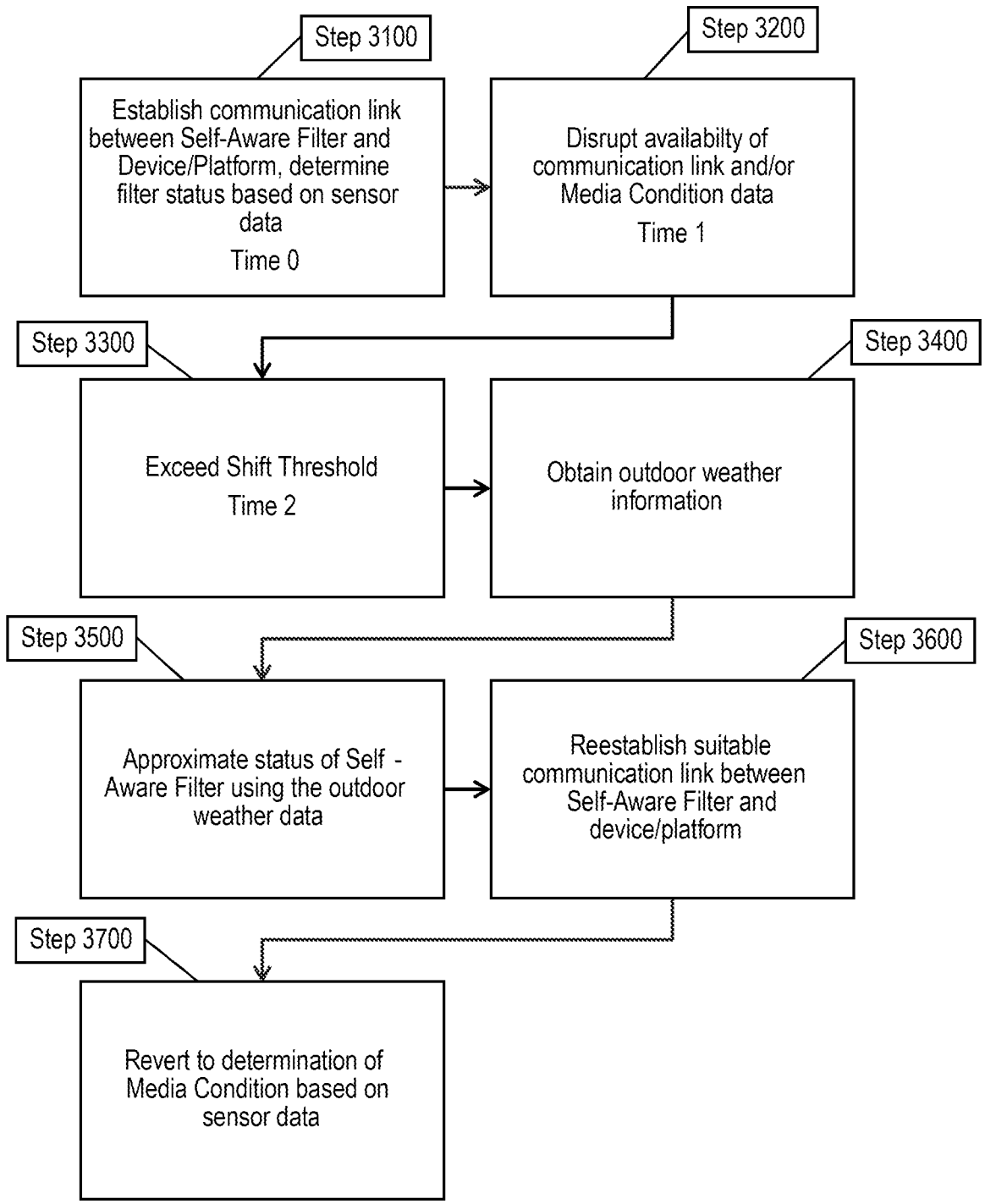
FIG. 23 is a block flow diagram illustrating the configuration and use of information from a plurality of sources to determine filter life according to an example embodiment.

An overall smart filter system with various options is now described (noting that this describes an exemplary arrangement in which at least one sensor is mounted on an air filter so that the air filter is self-aware when in use). FIG. 22 is a block diagram representation of multiple elements and alternative elements in a smart filter system 2400. System 2400 comprises three major elements, an air filter 2410 that is self-aware when in use, software algorithms 2412 that collect data from the filter 2410, and a user interface 2414 to display relevant information on a display, such as e.g. a mobile device display. The mobile device may be a laptop computer, cellular telephone, tablet, or other device capable of receiving, processing, and displaying information.

Self-Aware Filter 2410 may be self-aware by means of a circuit incorporated into the filter, attached to the filter during installation, or in a frame the holds the filter. Once the filter is installed, it can identify that it is a particular brand of filter, and provide digital data about the filter during operation. In addition, the filter may provide data regarding air quality of air moving through the system 2400.

Software algorithms 2412 collect data from one or more sensors and manipulate the data for future analysis, and store multiple data strings (from multiple collection sessions) for future transmission and reporting.

The user interface 2414 presents the data in a format that lets the end user readily see filter performance. It may provide historical data and/or current conditions. It may offer a prediction of time to filter replacement based on filter condition and time of use. It can provide data in any format useful to the consumer including alerts and automatic ordering capabilities. It may display air quality data at a room, building, or facility level. Air quality data may be pulled from external air quality monitoring services, air quality monitoring devices outside the HVAC system, or one or more sensors in the HVAC system.

A Filter ID 2416 can be passive 2418 or active 2420. Passive ID embodiments may include use of a magnetic switch 2422 which closes when the filter is inserted, or by having a simple socket 2424 built into the filter that activates the circuit when it is plugged in. Active means 2420 could be accomplished by means of a passive resonant circuit 2426 attached to an HVAC device which resonates when the filter and sensor circuit are installed therein. Other means could be used to detect the filter such as RF ID tags 2428, NFC tags 2430, or by reading a bar code or QR code 2432. In another embodiment, the Filter ID may be programmed on the sensor 2431 and communicated from the sensor via Bluetooth or other wireless communication protocol to a mobile device or cloud platform.

Media Condition 2434 can be determined by an electronic data collection circuit and a sensor 2436, and reported by wireless transmission shown under a communications block 2438. There are a variety of sensors 2436 that may be used in order to evaluate the condition of the filter. A physical sensor 2440 can evaluate eventual bowing of the filter using a strain gauge 2442. Other sensors that could be used include optical 2444, pressure 2446, air flow 2448 or vibration 2450. There are a number of different versions of each type of these sensors. The pressure sensor 2446 may be a differential pressure sensor 2452 or a single pressure sensor 2454 that may integrate pressure over time or compare pressure measurements when a fan is on and off Optical 2444 media condition sensing may detect fowling 2456 by measuring transmission of light through the media via a photodetector for example. Airflow 2448 may be indicative of fan operation, which may be used in conjunction with a pressure measurement from a single downstream filter to determine the condition of the filter. In further embodiments, airflow sensors may be used to measure the change in airflow over time, with decreased airflow being associated with a deteriorating condition of the filter media. A threshold corresponding to the decrease in airflow may be used to determine that the filter should be replaced. Airflow may be measured by electrical means 2458 including for example vibration sensor 2460, thermoelectric sensor 2462, or bend sensor 2464 (piezoelectric based in one embodiment). Mechanical means 2466 of sensing may include a vane based sensor 2468 to measure air turbulence, which may represent fan operation as well as filter media condition, as turbulence may change responsive to deterioration of filter media condition. Each of these sensors provide information regarding operation of the fan. In some embodiments, operation of the fan may be detected by measuring current flow to the fan to provide an indication of loading on the fan motor, which may be directly representative of the condition of the filter media.

When data from multiple sensors is collected, the data may be fused in multiple different ways to determine the filter media condition. For instance, data representative of fan operation may be used with a single downstream pressure reading in one embodiment. Vibration information may be combined with pressure in a further embodiment. Multiple vibration and turbulence measurements may be used in further embodiments. Many different sensors, either individually or combined may provide information from which the condition of the filter media may be calculated in various embodiments, either from the information of any one or of the sensors or from information fused from multiple sensors.

Data that is collected can be communicated at one or more options under communications 2438. Communications by wireless means can be accomplished using a variety of wireless protocols including wireless 2.4 GHz or 5 GHz, Bluetooth or Bluetooth BLE 2470, ZigBee 2472, Zwave 2474, Halo, or other standard or custom protocols represented at 2476.

It will be clear from the discussions herein that in some embodiments, the data that is wirelessly transmitted by circuitry that is coupled to the at least one sensor, can be at least substantially the same data that the circuitry receives from the sensor. For example, such circuitry may receive data that is outputted by a pressure sensor in analog form, and may convert this data to digital form for such data to be wirelessly transmitted. In other embodiments, such data that is transmitted by the circuitry may be derived from the data that is received from the sensor, but may be processed by the circuitry so that it is no longer in substantially the same form. For example, such derived data might be e.g. smoothed, averaged, or otherwise treated.

In some embodiments such derived data may result from manipulating the as-received data according to one or more algorithms, rather then e.g. merely averaging or smoothing the data. For example, such an algorithm might receive data e.g. in the form of pressure, and might process this data along with information such as e.g. the filtration characteristics of the filter media of the particular air filter that is in use, in order to obtain derived data or information that provides an enhanced ability to predict the filter life of this particular air filter. That is, in some embodiments such manipulation of data may be carried out by circuitry that is coupled to the sensor (e.g. that is co-located within a housing that contains the sensor). Thus, the concept of such data that is wirelessly transmitted by such circuitry, can in some embodiments include derived data. However, in some convenient embodiments such circuitry may serve only to convert the received data into digital format for wireless transmission, with the actual manipulation of the data to obtain derived data (and to calculate a remaining filter lifetime therefrom) may be performed at a remote location, e.g. in a cloud platform as noted earlier herein.

It will be understood from the discussions above that in some embodiments a housing may comprise only a sensor and sufficient circuitry for digitizing and transmitting the data outputted by the sensor, with additional circuitry being located elsewhere for receiving the transmitted data and performing further data manipulation. However, in other embodiments, such a housing may comprise sufficient circuitry (including e.g. one or more processors, firmware, software, etc.) to process or manipulate the data in any desired matter and then wirelessly transmit the resulting derived data. Any such data, whether e.g. in its original, digitized, or derived form, may be transmitted to a device such as e.g. a mobile device such as a smart phone, a home computer, or a device that is resident in the air-handling system itself. In some embodiments, such a device may perform processing and/or manipulation of the data; or, the device may forward the data e.g. to a cloud platform for such manipulation.

The final work product of the data manipulation (e.g. as outputted by a cloud platform) is an indication of the condition of the filter media of the air filter, and may be provided to a notification unit. Such a notification unit may be e.g. a mobile device or a computer (e.g. the same one that forwarded data to the cloud platform), or may be a component of the air-handling system. That is, an indication of remaining filter life (which may include a recommendation that the filter is near the end of its useful life and should be replaced) may be provided as a notification that is e.g. displayed on a display screen of a thermostat of the air-handling system, or may appear on a screen of a mobile device, a home computer, laptop computer, or tablet computer, or the like. Such a notification may take the form of an audible signal from any such notification unit; or it may be conveniently presented as a visual signal as noted. In various embodiments, such a notification may take the form of an email, a text message, a message launched by an application e.g. of a mobile device, and so on.

It is noted that the arrangements herein do not require that any such data that is obtained by a sensor must be presented to a user in any specific form (in particular, in a form such as pressure) and do not necessarily require that any particular parameter such as pressure drop in specified units, particulate loading, or the like, must ever be explicitly calculated. Rather, all is needed is that the data be processed or manipulated to a sufficient extent that an indication of the filter condition (e.g., a notification that the air filter is recommended to be replaced) can be provided to a user.

Power 2478 for circuitry, including sensors, can come from a variety of sources. One option is a battery 2480. Alternately, energy for operating the circuit can be harvested 2482 from the environment. Examples could be devices that generate power from air movement 2484 when the HVAC system is in operation, such as a turbine 2486 or via vibrations 2488 utilizing an oscillating ribbon with piezoelectric 2489 or inductive generators 2490. Alternately power could be generated using the thermoelectric effect 2492, or power could be supplied externally with an RF transmission signal 2494.

Air Quality 2496 can be defined in a number of ways depending on many factors but could include measurement via sensors 2498 of particulate on the clean air side, measuring VOCs, measurement of particulate in a given room or building, etc.

Under certain circumstances, the smart filter system may lack information sufficient to determine media condition based solely on data from a sensor or multitude of sensor. For instance, the user may leave the home for a week and yet leave his or her HVAC system running. As another example, the user may move to a location in the home or facility beyond the reach of the wireless communication signal. Each results in potential loss of data communication between the sensor and the user's mobile device, but the filter condition will continue to deteriorate. Depending on the duration of the communication loss, the Media Condition reported to the user may not accurately reflect status of a filter media. In these and other situations, it may be possible to supplement an output of a predictive filter replacement algorithm for sensor data over the requisite time period.

In one example, the missing data is supplemented by estimating replacement status as a function of HVAC fan runtime. Fan runtime can be estimated using outdoor weather data and can be adjusted in accordance with parameters relevant to the particular air filter and/or HVAC system operating conditions, such as dwelling parameters, HVAC use parameters, user preference parameters, and filter parameters. The weather data can be obtained for a particular region, for example, from an online data service. The weather data can be used to estimate air filter runtime, and the air filter runtime can be used to estimate the replacement status of the air filter. Exemplary methods for estimating filter replacement status as a function of fan runtime are described in International Publication No. WO 2016/089688 (Fox et al.), which is incorporated by reference in its entirety herein.

Figure 24:
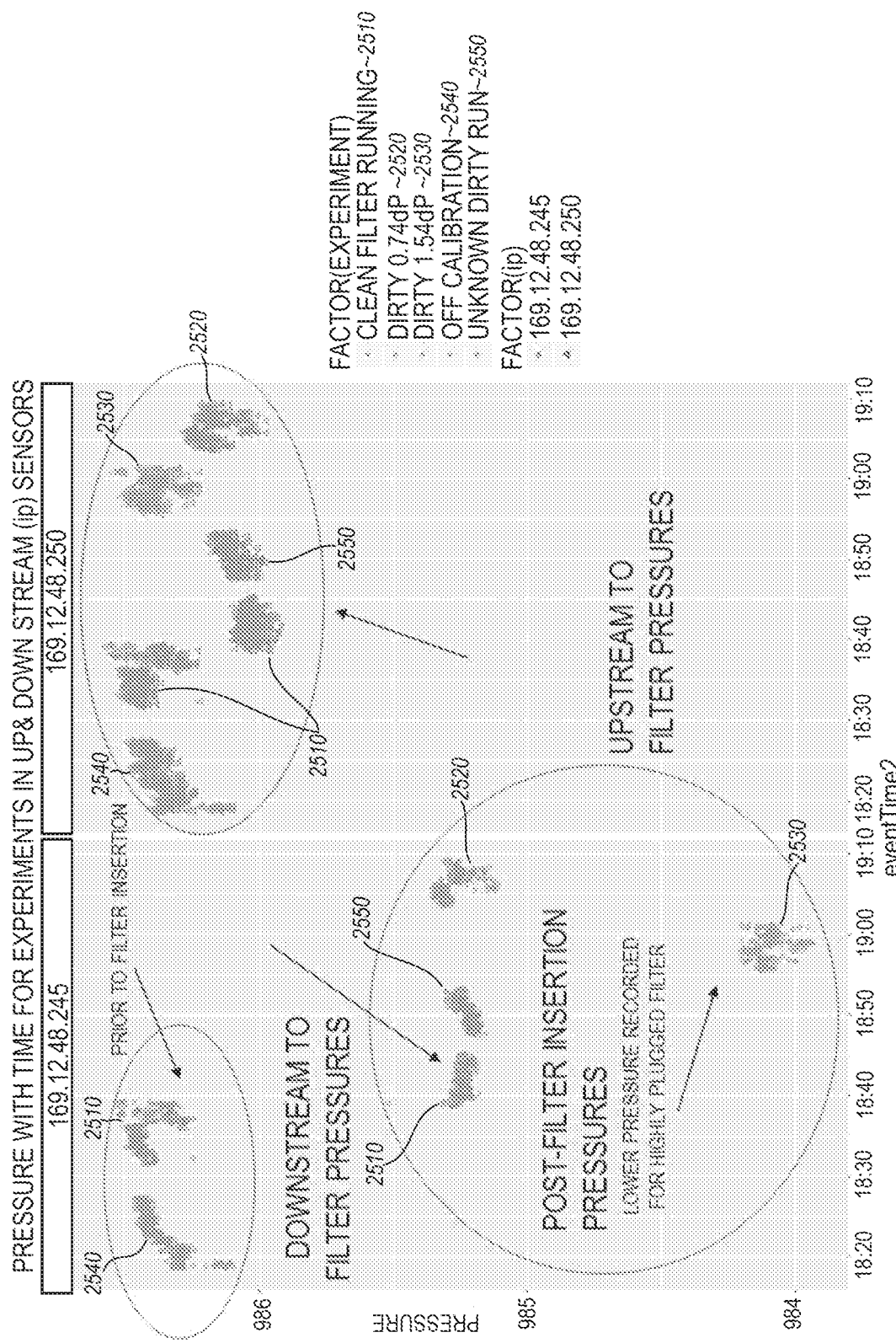
FIG. 24 illustrates multiple pressure measurements indicative of differential pressure across a filter under varying conditions over time according to an example embodiment.

FIG. 24 illustrates an exemplary sequence for shifting between sensor data and estimated status in reporting filter condition. At Step 3000 and "Time 0" a communication link is established between a Self-Aware Filter and a mobile device or cloud platform. At step 3100 and "Time 1", the communication provides substandard or no data from the sensor. Data may be substandard, for example, if a confidence value assigned to a given output parameter is not met or exceeded. In Step 3200 and "Time 2", the time period of substandard or lacking data reaches or exceeds a Shift Threshold, which may be based on, e.g., the amount of time between successful communication links or predictive results. Once the Shift Threshold is exceeded, outdoor weather data for a geographical region related to the HVAC system is obtained (e.g., electronically retrieved from an online data service) in Step 3300. Outdoor weather data can be collected contemporaneously with data from the sensor(s), or such collection may be triggered upon reaching the Shift Threshold. In Step 3400, the replacement status of the air filter is approximated using the outdoor weather data. For example, the outdoor weather data is used to estimate air filter runtime, and the air filter runtime is used to estimate the replacement status of the air filter. The estimation can be provided to the user via the user interface, which may or may not share a sensory experience similar to estimation premised primarily on sensor data. At Step 3500, the Self-Aware Filter establishes a communication link with the user's mobile device and/or relevant output parameters are deemed acceptable at "Time 3". The system may immediately (or near-immediately) shift back to predicting filter condition based on data received from the sensor, or may continue operating based on weather-based estimation until a suitable link is established for a time period exceeding a Reversion Threshold at Step 3700.

An experiment using two sensors, one before a filter and one after the filter produced the following results during different states (conditions). Using the pressure difference between the $P_1$ and $P_2$ sensors (before filter and after filter respectively) as a determination for filter obstruction measurement is well understood. Determining if a single sensor before the filter or a single sensor after the filter can provide enough information to determine filter obstruction was not previously understood.

A sample of data during different states of operation for an experimental furnace provides the following graph data.

FIG. 24 illustrates multiple pressure measurements indicative of differential pressure across a filter under varying conditions over time. A legend indicates various factors with reference numbers. The different states listed in the legend to the right (factor(experiment)) are as follows:

Cleanfilterrunning 2510—this is the furnace with the fan running with a new clean filter Dirty0.74dP 2520—an obstructed filter with the value of 0.74 inches of water Dirty1.54dP 2530—an obstructed filter with the value of 1.54 inches of water (more obstructed than 0.74)

Offcalibration 2540—the furnace is not running and the pressure is equalized in both chambers to atmospheric pressure Unknowndirtyrun 2550—an obstructed filter of unknown filtration level.

FIGS. 25, 26, 27, 28, 29, and 30 utilize a similar legend, with the first two digits of the reference numbers indicative of the figure number and the last two digits being the same as those in FIG. 24.

Figure 25:
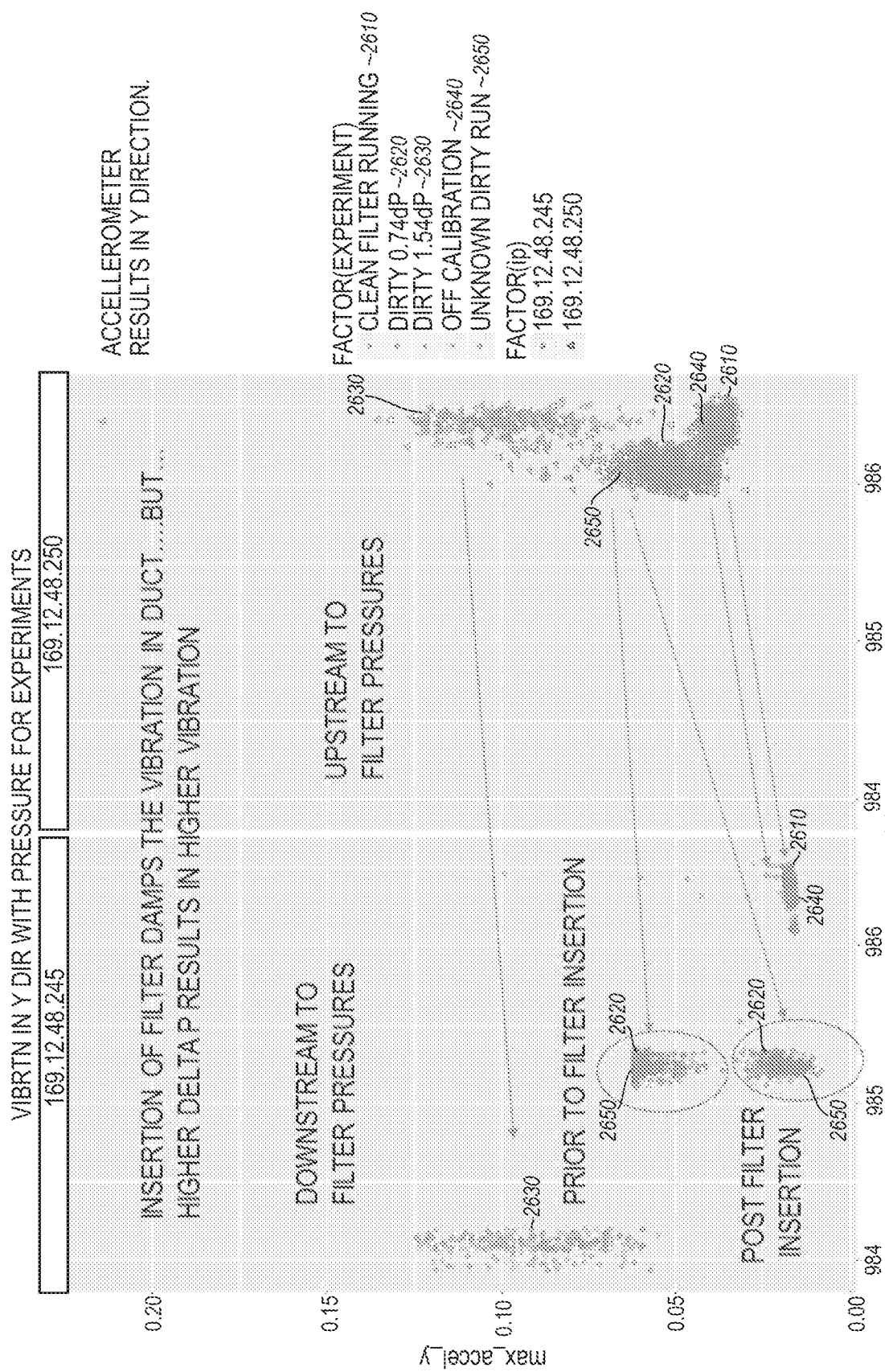
FIG. 25 illustrates data collected from an accelerometer sensor measuring vibration in a y-direction in the duct in which the filter is inserted according to an example embodiment.
Figure 26:
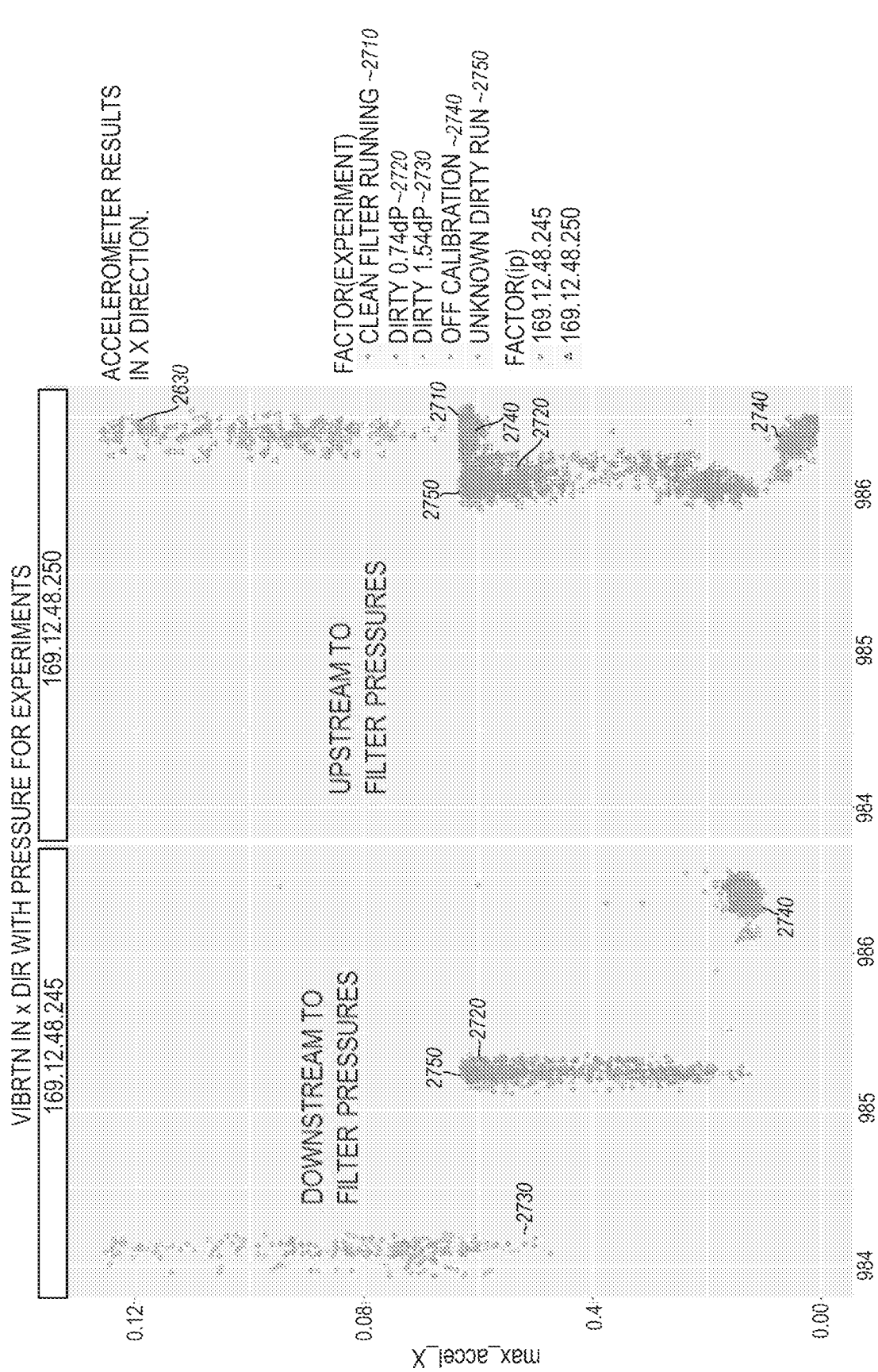
FIG. 26 similarly illustrates measurements of vibration in an x-direction according to an example embodiment.
Figure 27:
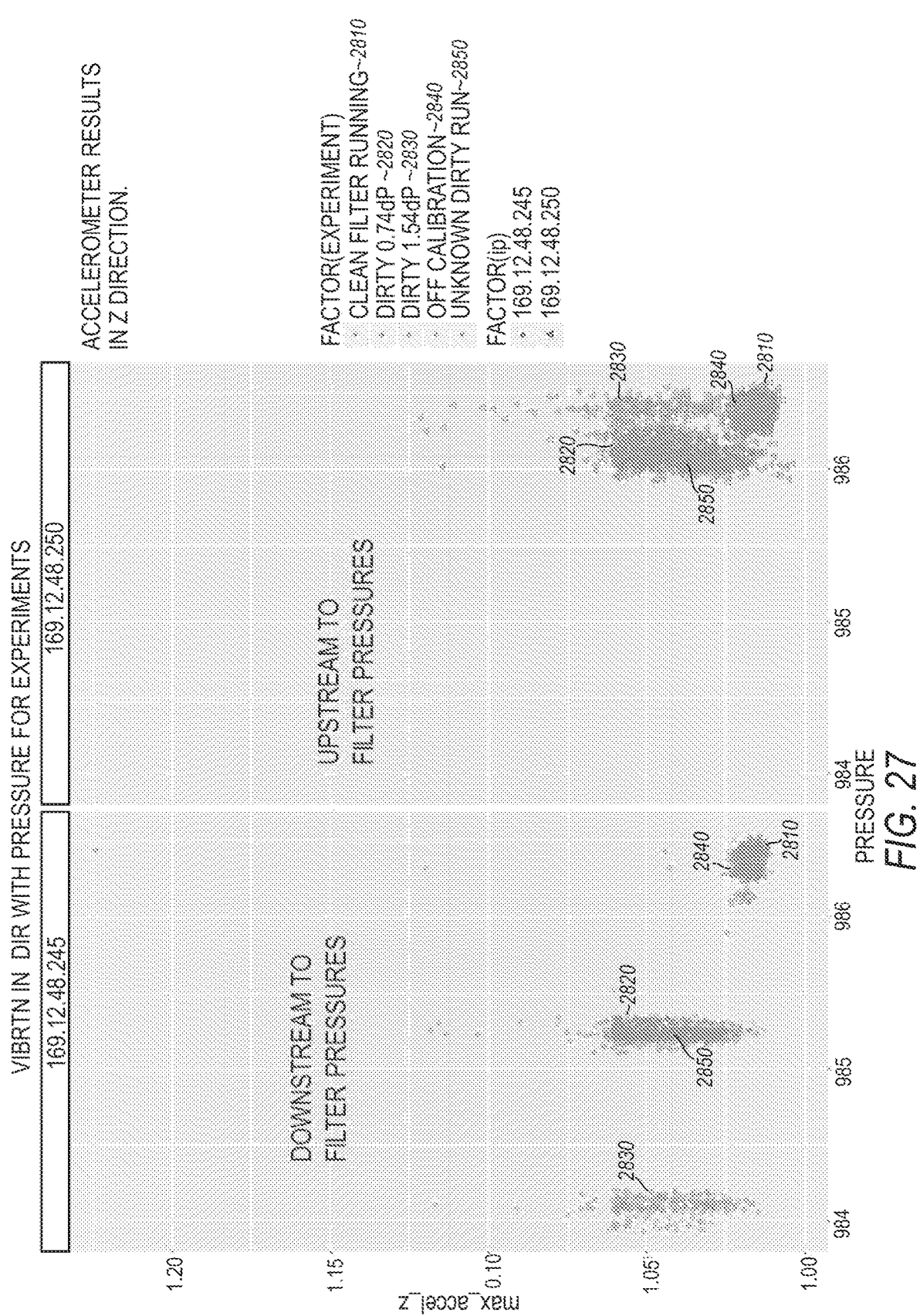
FIG. 27 similarly illustrates measurement of vibration in a z-direction according to an example embodiment.
Figure 28:
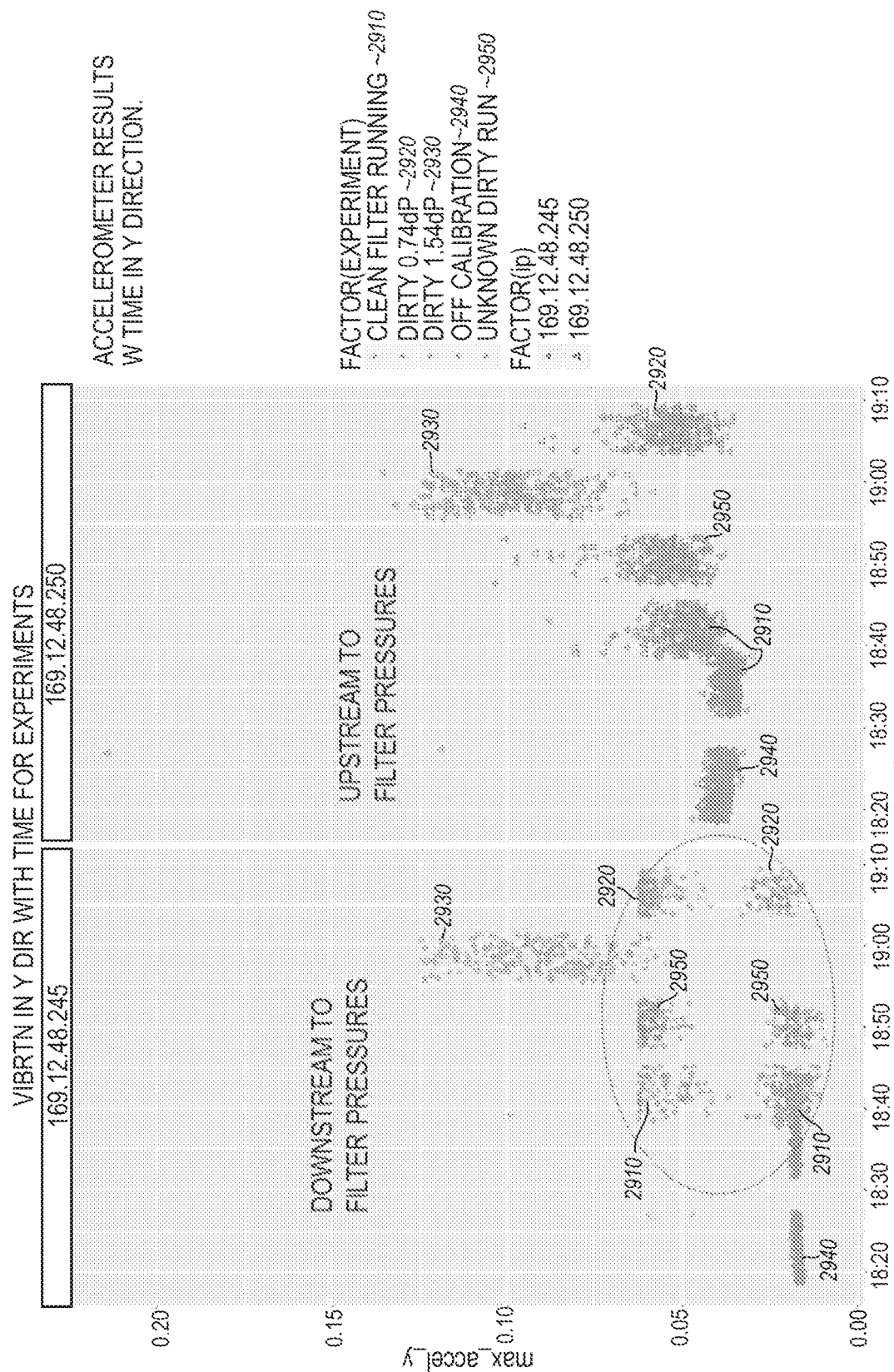
FIG. 28 illustrates accelerometer results with respect to time in the y-direction according to an example embodiment.
Figure 29:
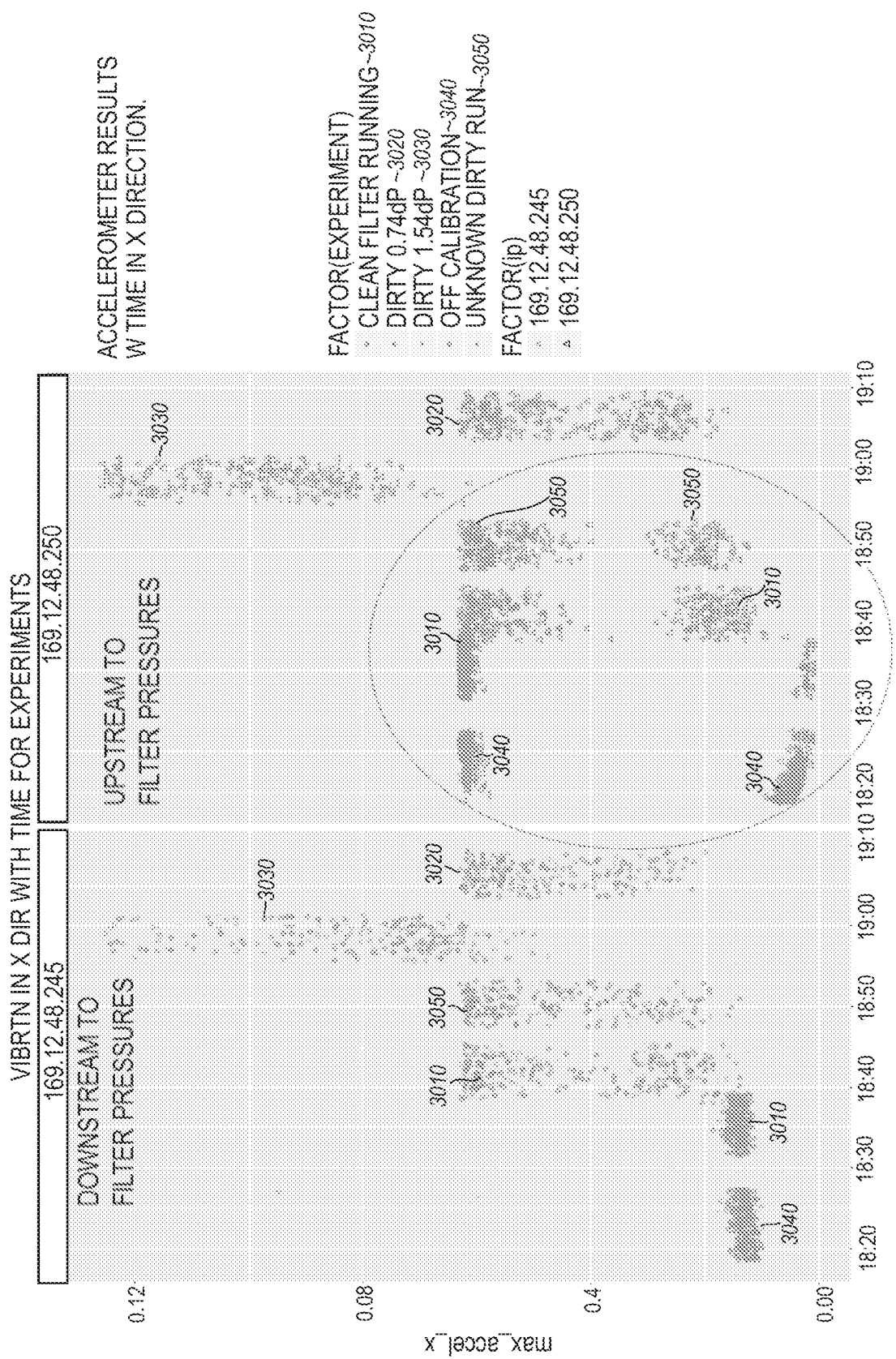
FIG. 29 illustrates accelerometer results with respect to time in the x-direction according to an example embodiment.
Figure 30:
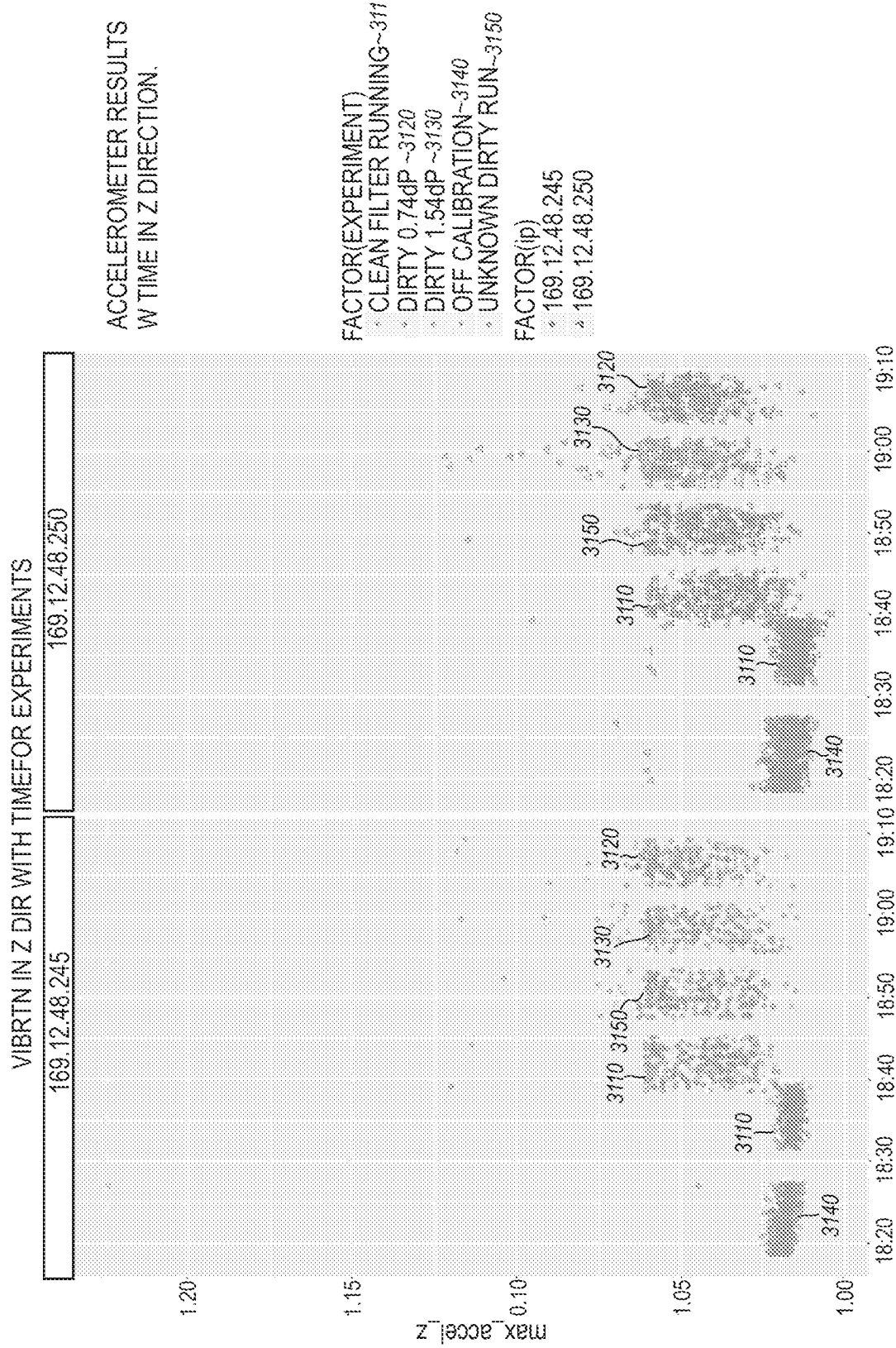
FIG. 30 illustrates accelerometer results with respect to time in the z-direction according to an example embodiment.

FIG. 25 illustrates data collected from an accelerometer sensor measuring vibration in a y-direction in the duct in which the filter is inserted. FIG. 26 similarly illustrates measurements of vibration in an x-direction. FIG. 27 similarly illustrates measurement of vibration in a z-direction. FIG. 28 illustrates accelerometer results with respect to time in the y-direction. FIG. 29 illustrates accelerometer results with respect to time in the x-direction. FIG. 30 illustrates accelerometer results with respect to time in the z-direction.

Note: Factor(ip) distinguishes TWO DIFFERENT SENSORS. 169.12.46.245 is DOWNSTREAM while 169.12.46.250 is UPSTREAM. The dirtier the filter, the greater the pressure drop downstream. The upstream sensors do not identify a significant pressure difference (right side of graph). These findings suggest that if a single pressure sensor is used, then the pressure sensor should typically be placed on the downstream side (after the filter).

The pressure differential is created by the suction between the obstructed filter and the fan drawing air.

$P_1$=Upstream Sensor Pressure
$P_2$=Downstream Sensor Pressure
$\Delta = P_1 + P_2$=Pressure Difference between Upstream Sensor Pressure and Downstream Sensor Pressure
T=Time A single sensor can work downstream (after the filter) and the system may be aware of time as well as a state of the furnace to assist in sensor performance. The state can be determined through accelerometer information to identify whether or not the furnace is running, or alternatively the state may be inferred by a temporal analysis of the pressure measurements. Simply separating high and low readings and averaging them may clearly identify which measurements correspond to the state of the furnace. Determining the pressure when the furnace is off may be useful in determining the baseline for the current barometric pressure. In one embodiment, determining the filter condition from a single sensor includes obtaining time-based pressure data points from the sensor; calculating a mean difference between obtained adjacent pressure data points; and estimating filter life based on the identification of a pressure difference in adjacent points that is greater than a threshold pressure difference.

Figure 31:
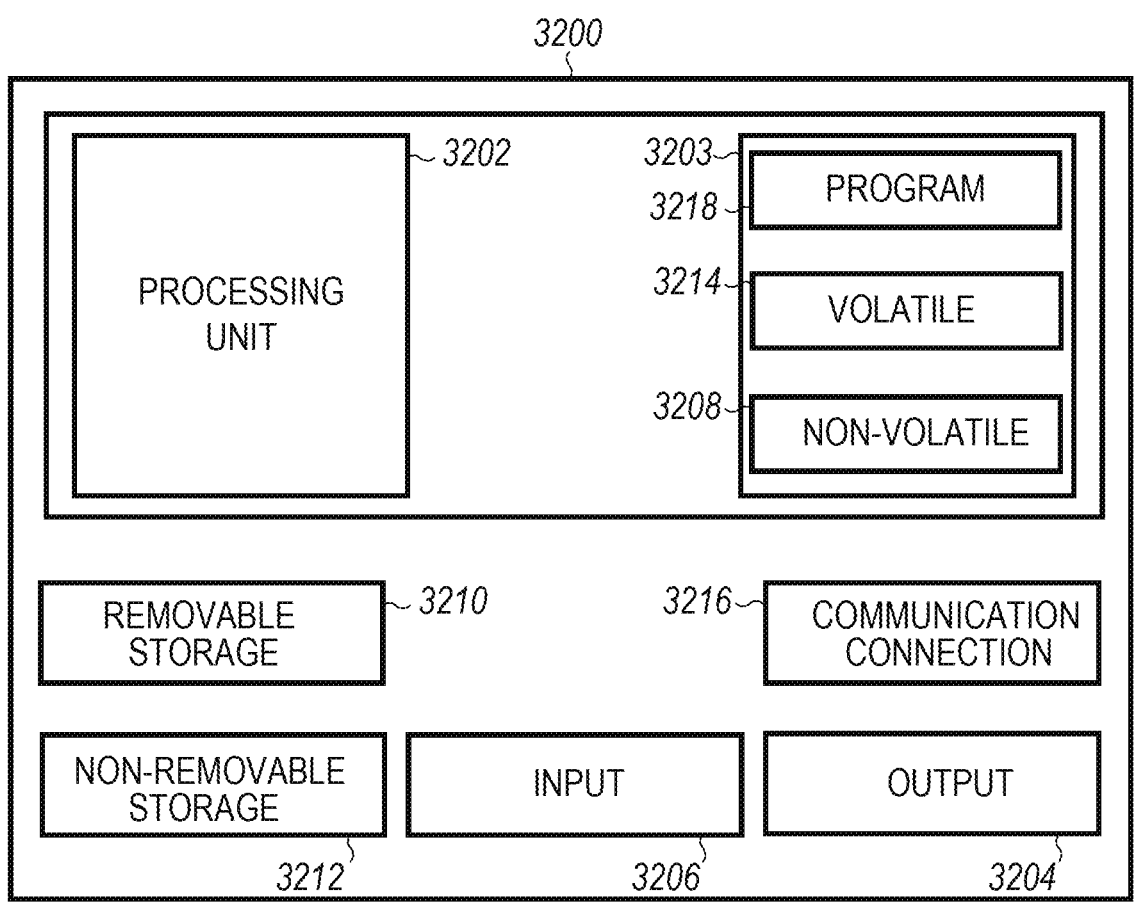
FIG. 31 is a block schematic diagram of a computer system to implement circuitry and methods according to an example embodiment.

FIG. 31 is a block schematic diagram of a computer system 3200 to implement methods according to example embodiments, such as implementation of smart filter circuitry and communications and implementation of a mobile device. All components need not be used in various embodiments.

One example computing device in the form of a computer 3200, may include a processing unit 3202, memory 3203, removable storage 3210, and non-removable storage 3212. Although the example computing device is illustrated and described as computer 3200, the computing device may be in different forms in different embodiments. For example, the computing device may instead be a smartphone, a tablet, smartwatch, or other computing device including the same or similar elements as illustrated and described with regard to FIG. 32. Devices such as smartphones, tablets, and smartwatches are generally collectively referred to as mobile devices. Further, although the various data storage elements are illustrated as part of the computer 3200, the storage may also or alternatively include cloud-based storage accessible via a network, such as the Internet.

Memory 3203 may include volatile memory 3214 and non-volatile memory 3208. Computer 3200 may include— or have access to a computing environment that includes—a variety of computer-readable media, such as volatile memory 3214 and non-volatile memory 3208, removable storage 3210 and non-removable storage 3212. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

Computer 3200 may include or have access to a computing environment that includes input 3206, output 3204, and a communication connection 3216. Output 3204 may include a display device, such as a touchscreen, that also may serve as an input device. The input 3206 may include one or more of a touchscreen, touchpad, mouse, keyboard, camera, one or more device-specific buttons, one or more sensors integrated within or coupled via wired or wireless data connections to the computer 3200, and other input devices. The computer may operate in a networked environment using a communication connection to connect to one or more remote computers, such as database servers, including cloud based servers and storage. The remote computer may include a personal computer (PC), server, router, network PC, a peer device or other common network node, or the like. The communication connection may include a Local Area Network (LAN), a Wide Area Network (WAN), cellular, Wi-Fi, Bluetooth, or other networks.

Computer-readable instructions stored on a computer-readable storage device are executable by the processing unit 3202 of the computer 3200. A hard drive, CD-ROM, and RAM are some examples of articles including a non-transitory computer-readable medium such as a storage device. The terms computer-readable medium and storage device do not include carrier waves.

The arrangements disclosed herein may be used with any suitable powered air-handling system. In some embodiments, such an air-handling system may be a heating-ventilation-air-conditioning (HVAC) system e.g. for a residence (e.g. a single-family home), a commercial or retail building or space, and so on. The term HVAC is used broadly; in various embodiments, an HVAC system may be configured to perform heating, to perform cooling, or to perform either heating or cooling, as desired. In some embodiments, such an HVAC system may be a centralized air-handling system in which air to be handled is collected via multiple air-return inlets (e.g., located in multiple rooms of a building). Such a system often comprises a single, central blower that is arranged to handle relatively large quantities of air from multiple rooms, which air is passed through a centralized air filter. In other embodiments, such an air-handling system may be a so-called mini-split system (often referred to as a "ductless" system) that collects air locally via a single air return and comprise a blower that is designed to recirculate air mainly within a single room. Representative mini-split HVAC systems include e.g. the products available from Fujitsu (Tokyo, JP) under the trade designation HALCYON. Some buildings may comprise numerous mini-split systems, each dedicated to a specific room or rooms of the building. (A large building may comprise multiple centralized HVAC systems, each serving a different portion or wing of the building.) In some embodiments the powered air-handling system may be a so-called room air purifier (e.g. that does not possess any significant heating or cooling capability); in other embodiments the powered air-handling system is not a room air purifier.

LIST OF EXEMPLARY EMBODIMENTS

Embodiment 1 is a powered air-handling system comprising: an air filter comprising filter media; at least one sensor that is resident in the powered air-handling system; and circuitry coupled to the sensor, the circuitry configured to receive data from the sensor representative of the condition of the filter media and to wirelessly transmit such data.

Embodiment 2 is the air filter of embodiment 1 wherein the at least one sensor comprises at least one pressure sensor. Embodiment 3 is the air filter of embodiment 2 wherein the at least one pressure sensor comprises a first pressure sensor positioned to be exposed to upstream pressure and a second pressure sensor positioned to be exposed to downstream pressure with respect to the filter media while air is moved through the filter media. Embodiment 4 is the air filter of embodiment 2 wherein the at least one pressure sensor is an absolute pressure sensor positioned downstream of the filter media to measure downstream pressure while air is moved through the filter media. Embodiment 5 is the air filter of embodiment 4 wherein the circuitry is adapted to determine a pressure difference across the filter media as a function of the data from the absolute pressure sensor. Embodiment 6 is the air filter of any of embodiments 4-5, further comprising a second sensor to provide second data, wherein the circuitry is further adapted to combine the second data with the data from the pressure sensor to determine the pressure difference. Embodiment 7 is the air filter of embodiment 6 wherein the second sensor comprises at least one sensor configured to sense operation of a fan to move air through the filter material. Embodiment 8 is the air filter of embodiment 6 wherein the second sensor is selected from the group consisting of a strain gage sensor, vibration sensor, thermoelectric airflow sensor, strain gage airflow sensor, and vane airflow sensor. Embodiment 9 is the air filter of any of embodiments 1-8 wherein the at least one sensor comprises a pressure sensor that is configured to acquire analog pressure data intermittently at a frequency that is no greater than once per thirty seconds and no less than once per day, and wherein the circuitry that is coupled to the sensor is configured to convert the analog pressure data to digitized pressure data and to store the digitized pressure data until such time as the digitized pressure is wirelessly transmitted.

Embodiment 10 is the air filter of any of embodiments 1-9 wherein the air filter comprises information that is locally-resident on the air filter. Embodiment 11 is the air filter of embodiment 10 wherein the information is locally-resident on the air filter by way of being loaded on an RFID tag that is mounted on the air filter. Embodiment 12 is the air filter of embodiment 11 wherein the powered air-handling system comprises an RFID reader configured to interrogate the RFID tag of the air filter.

Embodiment 13 is the air filter of any of embodiments 1-12 wherein the circuitry is configured to generate an alert indicative of a time to replace the air filter as a function of the sensed condition of the filter. Embodiment 14 is the air filter of any of embodiments 1-13 wherein the circuitry wirelessly transmits data by at least one communication protocol selected from the group consisting of Bluetooth, Bluetooth Low Energy, ZigBee, Zwave, and Wi-Fi. Embodiment 15 is the air filter of any of embodiments 1-14 wherein the powered air-handling system is a centralized HVAC system of a building.

Embodiment 16 is a method of monitoring and reporting the condition of an air filter installed in a powered air-handling system, the method comprising: wirelessly receiving pressure information representative of at least a downstream pressure of the powered air-handling system, the information originating from at least one pressure sensor; receiving information regarding the filtration characteristics of an air filter media of the air filter, from a source that is locally-resident on the air filter; and, generating an indication of a condition of the air filter, as a function of the pressure information in combination with the information regarding the filtration characteristics of the air filter media.

Embodiment 17 is the method of embodiment 16 wherein the source of the locally-resident information regarding the filtration characteristics of the air filter is an RFID tag mounted on the air filter. Embodiment 18 is the method of any of embodiments 16-17 wherein the pressure information comprises data obtained while air is moving through the air filter and data obtained while air is not moving through the air filter. Embodiment 19 is the method of any of embodiments 16-18 wherein the pressure information comprises data obtained from a first pressure sensor located downstream of the air filter and data obtained from a second pressure sensor located upstream of the air filter.

Embodiment 20 is the method of any of embodiments 16-19 wherein the at least one pressure sensor is resident in the powered air-handling system. Embodiment 21 is the method of any of embodiments 16-20 wherein the at least one pressure sensor is located within a housing, and wherein circuitry is co-located in the housing with the pressure sensor that converts pressure data originating from the pressure sensor from analog form to digital form and that wirelessly transmits the digital pressure information. Embodiment 22 is the method of embodiments 16-21 wherein digital pressure information is wirelessly received by a device that forwards the digital pressure information to a cloud platform that uses the digital pressure information in combination with the information regarding the filtration characteristics of the air filter media, to generate an indication of the condition of the air filter.

Embodiment 23 is the method of any of embodiments 16-22 wherein the information regarding the filtration characteristics of the air filter media of the air filter is read from an RFID tag that is mounted on the air filter. Embodiment 24 is the method of embodiment 23 wherein the information on the RFID tag is read by an RFID reader that is mounted on a mobile device or is mounted on the powered air-handling system. Embodiment 25 is the method of any of embodiments 23-24 wherein the information that is read by the RFID reader is wirelessly transmitted to a cloud platform.

Embodiment 26 is the method of any of embodiments 16-25 wherein the indication of the condition of the air filter comprises an indication of the remaining filter lifetime of the air filter, and wherein the indication is presented on a display of a mobile device, of a computer, or of a thermostat of the powered air-handling system. Embodiment 27 is the method of any of embodiments 16-26 wherein the pressure information that is wirelessly received, comprises data that was taken by a pressure sensor in analog form, intermittently at a frequency of no greater than once per thirty seconds and no less than once per day, which data was then digitized and stored until such time as the digitized, stored data could be wirelessly transmitted.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). To the extent that there is any conflict or discrepancy between this specification as written and the disclosure in any document that is incorporated by reference herein, this specification as written will control.

This application claims priority to U.S. Provisional Patent Applications 62/372,156 and 62/374,040, both of which are incorporated by reference herein in their entirety.

What is claimed is:

1. A method of monitoring and reporting the condition of an air filter installed in a powered air-handling system, the method comprising:

wirelessly receiving pressure information representative of a downstream, absolute pressure of the powered air-handling system, the information originating from a single, absolute pressure sensor that is resident in the powered air-handling system at a location downstream of the air filter such that the single, absolute pressure sensor is not mounted on the air filter;

receiving information regarding the filtration characteristics of an air filter media of the air filter, from a source that is locally-resident on the air filter;

and, generating an indication of a condition of the air filter, as a function of the pressure information in combination with the information regarding the filtration characteristics of the air filter media, with the proviso that the only information that is received from a sensor and used in combination with the information from the source that is locally-resident on the air filter to generate the indication of the condition of the air filter, is the pressure information representative of the downstream, absolute pressure of the powered air-handling system, that is wirelessly received from the single, absolute pressure sensor.

2. The method of claim 1 wherein the pressure information comprises data obtained while air is moving through the air filter and data obtained while air is not moving through the air filter.

3. The method of claim 1 wherein the pressure sensor is located within a housing, and wherein circuitry is co-located in the housing with the pressure sensor that converts pressure data originating from the pressure sensor from analog form to digital form and that wirelessly transmits the digital pressure information.

4. The method of claim 3 wherein the digital pressure information is wirelessly received by a device that forwards the digital pressure information to a cloud platform that uses the digital pressure information in combination with the information regarding the filtration characteristics of the air filter media, to generate an indication of the condition of the air filter.

5. The method of claim 1 wherein the source of the information that is received regarding the filtration characteristics of the air filter media of the air filter is an RFID tag that is mounted on the air filter.

6. The method of claim 5 wherein the information regarding the filtration characteristics of the air filter media of the air filter is read from the RFID tag by an RFID reader and is then wirelessly transmitted to a cloud platform that uses the pressure information in combination with the information regarding the filtration characteristics of the air filter media to generate an indication of the condition of the air filter and then send a notification of remaining filter life to a mobile device.

7. The method of claim 1 wherein the indication of the condition of the air filter comprises an indication of the remaining filter lifetime of the air filter, and wherein the indication is sent to, and presented on a display of, a mobile device that is not a thermostat of the powered air-handling system.

8. The method of claim 1 wherein the pressure information that is wirelessly received, comprises data that was taken by a pressure sensor in analog form, intermittently at a frequency of no greater than once per thirty seconds and no less than once per day, which data was then digitized and stored until such time as the digitized, stored data could be wirelessly transmitted.

9. The method of claim 1 wherein the circuitry is adapted to determine a pressure difference across the filter media as a function of the data from the absolute pressure sensor.

10. The method of claim 1 wherein the powered air-handling system is a centralized HVAC system of a building.

11. The method of claim 1 wherein the source of the information that is received regarding the filtration characteristics of the air filter media of the air filter is a bar code or QR code that is mounted on the air filter.

12. The method of claim 11 wherein the information regarding the filtration characteristics of the air filter media of the air filter is read from the bar code or QR code by a reader that is resident on a mobile device and is then wirelessly transmitted to a cloud platform that uses the pressure information in combination with the information regarding the filtration characteristics of the air filter media, to generate an indication of the condition of the air filter and send a notification of remaining filter life to the mobile device.

13. The method of claim 1 wherein the pressure information is wirelessly received by a mobile device that also receives the information regarding the filtration characteristics of the air filter media of the air filter, wherein the mobile device forwards the pressure information and the information regarding the filtration characteristics of the air filter media of the air filter to a cloud platform that uses the pressure information in combination with the information regarding the filtration characteristics of the air filter media to generate the indication of the condition of the air filter; and, wherein the notification of remaining filter life is then sent to the mobile device.

14. The method of claim 1 wherein the information regarding the filtration characteristics of the air filter media of the air filter is preloaded by the filter manufacturer onto the source that is locally-resident on the air filter and includes information regarding the degree to which the air filter media exhibits an increased pressure drop upon being loaded with particles.

* * * * *